(12) United States Patent
Nene

(10) Patent No.: US 11,146,560 B1
(45) Date of Patent: Oct. 12, 2021

(54) DISTRIBUTED GOVERNANCE OF COMPUTING RESOURCES

(71) Applicant: Amazon Technologies, Inc., Seattle, WA (US)

(72) Inventor: Bhushan Nene, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 155 days.

(21) Appl. No.: 16/118,351

(22) Filed: Aug. 30, 2018

(51) Int. Cl.
| | |
|---|---|
| *H04L 29/06* | (2006.01) |
| *G06F 21/62* | (2013.01) |
| *G06F 16/18* | (2019.01) |
| *G06F 16/23* | (2019.01) |
| *G06F 16/27* | (2019.01) |

(52) U.S. Cl.
CPC .......... *H04L 63/10* (2013.01); *G06F 16/1805* (2019.01); *G06F 16/2365* (2019.01); *G06F 21/6218* (2013.01); *H04L 63/126* (2013.01); *G06F 16/27* (2019.01); *H04L 2209/38* (2013.01)

(58) Field of Classification Search
CPC ... H04L 63/126; H04L 63/10; H04L 2209/38; H04L 63/101; H04L 63/102; H04L 63/104; G06F 16/2365; G06F 16/1805; G06F 21/6218; G06F 16/27
See application file for complete search history.

(56) References Cited

U.S. PATENT DOCUMENTS

| | | | | |
|---|---|---|---|---|
| 9,592,969 | B2* | 3/2017 | Wolfe | B65G 51/44 |
| 10,868,836 | B1* | 12/2020 | Yancey | H04L 63/205 |
| 2005/0166260 | A1* | 7/2005 | Betts | G06F 21/6218 726/4 |
| 2006/0143685 | A1* | 6/2006 | Vasishth | G06F 21/577 726/1 |
| 2007/0016630 | A1* | 1/2007 | Samji | H04L 67/1095 |
| 2008/0059543 | A1* | 3/2008 | Engel | G06Q 10/10 |
| 2008/0184336 | A1* | 7/2008 | Sarukkai | G06F 21/6218 726/1 |
| 2012/0110059 | A1* | 5/2012 | Nukala | H04W 12/37 709/203 |
| 2012/0185913 | A1* | 7/2012 | Martinez | G06F 9/45558 726/1 |
| 2017/0093753 | A1* | 3/2017 | Summers | H04L 47/72 |
| 2017/0142161 | A1* | 5/2017 | Riley | G06Q 10/06313 |
| 2017/0213289 | A1* | 7/2017 | Doney | G06Q 40/025 |
| 2018/0069899 | A1* | 3/2018 | Lang | G06F 8/38 |
| 2018/0096163 | A1* | 4/2018 | Jacques de Kadt | G06F 21/602 |
| 2018/0285479 | A1* | 10/2018 | Mackay | G06F 21/6218 |
| 2018/0285996 | A1* | 10/2018 | Ma | G06F 16/2428 |
| 2018/0286239 | A1* | 10/2018 | Kaloyeros | G08G 1/012 |
| 2018/0350451 | A1* | 12/2018 | Ohnemus | G16H 20/30 |
| 2018/0356989 | A1* | 12/2018 | Meister | G06F 11/2064 |
| 2018/0357019 | A1* | 12/2018 | Karr | G06F 11/3055 |
| 2019/0058709 | A1* | 2/2019 | Kempf | H04L 9/3226 |

(Continued)

*Primary Examiner* — Malcolm Cribbs

(74) *Attorney, Agent, or Firm* — Hogan Lovells US LLP

(57) ABSTRACT

Technology is described for a distributed ledger service within a service provider environment. The distributed ledger service may implement a distributed ledger formed from immutable append-only data structure and used for governance of computing resources. A policy governing a computing resource may be created and published to the distributed ledger on behalf of an account. The policy may be retrieved from the distributed ledger to govern access to the computing resource by the account.

20 Claims, 13 Drawing Sheets

(56) References Cited

U.S. PATENT DOCUMENTS

| | | | |
|---|---|---|---|
| 2019/0080392 A1* | 3/2019 | Youb | G06Q 40/04 |
| 2019/0132350 A1* | 5/2019 | Smith | H04L 41/22 |
| 2019/0149550 A1* | 5/2019 | Brakeville | G06F 21/62 |
| | | | 726/5 |
| 2019/0188655 A1* | 6/2019 | Pandit | G06Q 20/223 |
| 2019/0188712 A1* | 6/2019 | Fedorov | G06F 21/51 |
| 2019/0306194 A1* | 10/2019 | Benson | H04L 41/0816 |
| 2019/0334886 A1* | 10/2019 | Lelcuk | G06Q 20/0658 |
| 2019/0354693 A1* | 11/2019 | Yoon | G06F 21/6245 |
| 2019/0379754 A1* | 12/2019 | Krishnaswamy | H04L 67/289 |
| 2020/0007581 A1* | 1/2020 | Vouk | H04L 63/20 |
| 2020/0034818 A1* | 1/2020 | Selfin | G06Q 20/3223 |
| 2020/0119925 A1* | 4/2020 | Wang | H04L 9/0637 |

* cited by examiner

DISTRIBUTED GOVERNANCE OF COMPUTING RESOURCES

BACKGROUND

Enterprise information technology (IT) organization structures are becoming increasingly complex. Enterprise IT may be made up of multiple business units and departments like marketing, finance, legal, and human resources. Having a complex business structure may influence the way IT systems are governed (e.g., developed, deployed, and managed) within the enterprise. In some cases, the enterprise may include a central IT department that deploys and manages systems for other departments. However, lines of business within one business entity or enterprise are increasingly developing and managing their own software applications and systems, and this independence typically leads to migration to a service provider environment (e.g., a cloud-computing environment), while creating independent accounts and infrastructure without oversight of the enterprise IT department.

In addition, enterprises commonly engage with systems integrators (SIs) and vendors, who develop and operate applications and systems on behalf of the enterprise. These SIs and vendors often operate within their own cloud accounts outside of the oversight of the enterprise IT department to perform the development for enterprises or customers, which makes IT compliance enforcement by enterprise information security (InfoSec) organizations difficult. While contractual obligations may exist to enforce data retention, security, and privacy requirements, active monitoring of SIs and vendors is not often feasible. Moreover, requiring external parties to share information (compliance, SLA, etc.) with the enterprise IT department by sending audit logs, performance logs, etc. depends on the integrity of these parties to not tamper with data and to share data regularly.

DETAILED DESCRIPTION

Figure 1A:
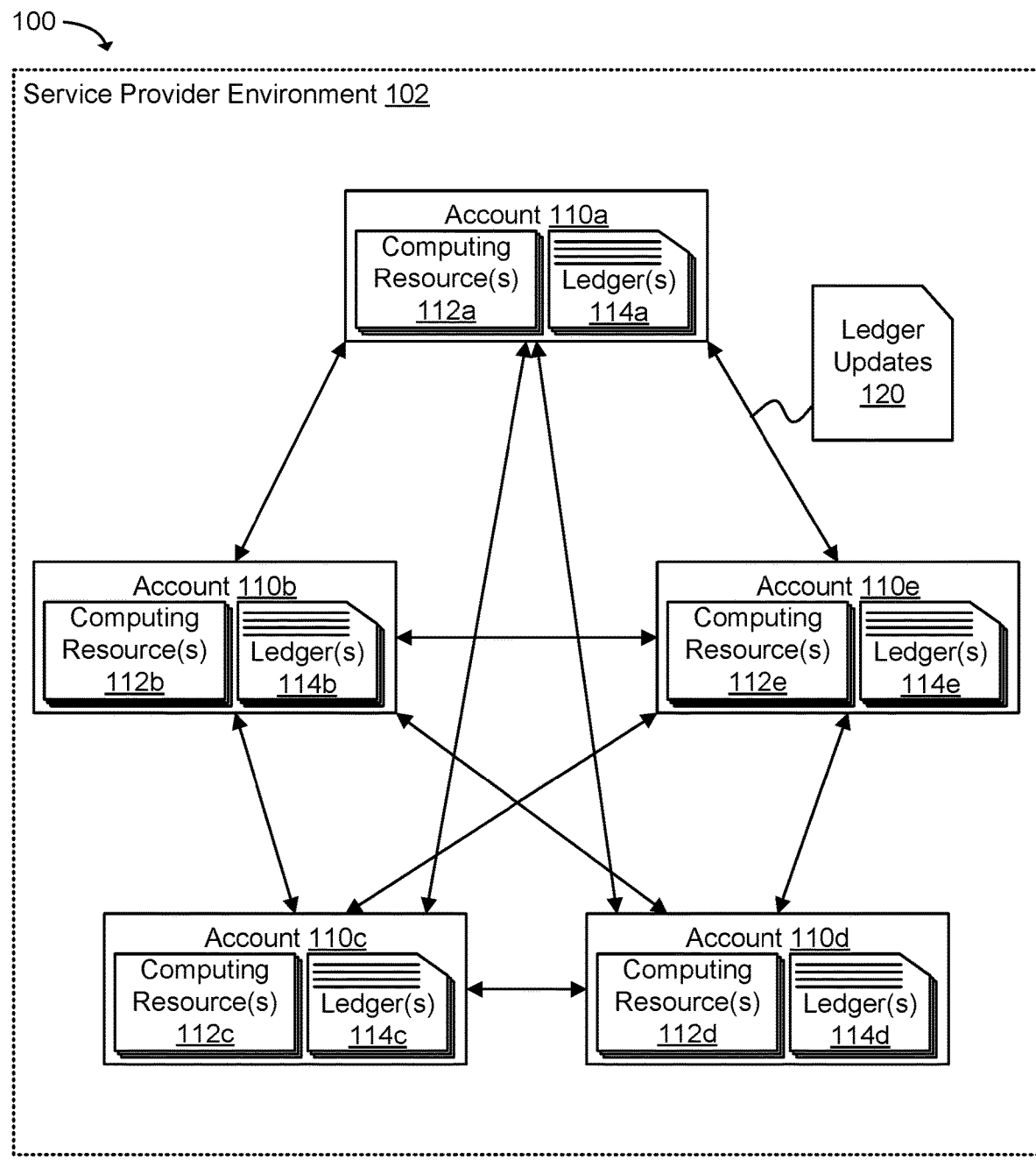
FIGS. 1A-1C are diagrams illustrating an example system and method for distributed governance of computing resources according to one example of the present technology.

A technology is described for a distributed ledger service within a service provider environment. The distributed ledger service may implement a distributed ledger using a data store service. Service level events and metrics added to the data store service may be replicated across a service provider's network, a local network, or a wide area network. Multiple parties with access to the distributed ledger may receive a copy of updates to the distributed ledger in real-time via the network with the knowledge that no one party can alter the ledger without discovery of modifications by another party. According to one example of the present technology, a distributed ledger may be formed using an immutable append-only data structure, such as a blockchain, that is used to provide an audit log and govern access rights to computing resources.

The distributed ledger service may enable synchronization of distributed ledgers across multiple accounts within a service provider environment. For example, a service provider environment may enable one or more services hosted by the service provider environment to publish service-level events and metrics to a distributed ledger that is replicated in multiple accounts. The services may be configured to log information, such as API calls, service configurations, status changes, and data accesses, and/or service accesses to the distributed ledger. The multiple accounts that participate in the distributed ledger may receive a copy of the updates logged to the distributed ledger. In another example, one or more of the multiple accounts within the service provider environment, such as those of an enterprise IT department, business units, and system integrators/vendors, may be configured to automatically process the API calls, service configurations, status changes, and data accesses, and/or service accesses logged to the distributed ledger. The enterprise InfoSec and auditors may subscribe to the distributed ledger to perform an audit of services and accounts, and the distributed ledger service enables the enterprise InfoSec and auditors to have automatic access to the ledger data. The enterprise InfoSec and auditors may perform forensic analysis of the ledger data to detect any non-compliance or breeches. As a result, the enterprise InfoSec and auditors may have the confidence that the ledger data is unaltered and has high fidelity.

According to one example of the present technology, the distributed ledger service may enable "triggers" that can take actions as entries are posted to distributed ledgers. These actions may occur within an account in the service provider environment. The distributed ledger service may also enable code functions to execute with ledger data associated with a new entry as the new entry or data is posted to the distributed ledger. The enterprise InfoSec and auditors may therefore identify security and compliance issues in real-time. In one example, if a system integrator changes permissions that leave a data store exposed to the public, an event describing the changes may be logged to the distributed ledger. The enterprise InfoSec and auditors may later discover the changes as a security lapse by analyzing ledger entries. The distributed ledger service may enable the enterprise InfoSec and auditors to attach a code function to specific events that can trigger actions and alerts as soon as entries corresponding to the specific events are posted to the distributed ledger. Use of code functions and triggered events may enable identification of security problems immediately rather than at a later point in time.

According to the present technology, the distributed ledger service may provide distributed ledger-based governance of computing resources. For example, a service provider environment may enable one or more accounts of the service provider environment to create policies that govern computing resources (e.g., computing resources linked to a distributed ledger). The distributed ledger service may publish the policies to distributed ledgers that are replicated in multiple accounts. According to one example of the present technology, the distributed ledger service may retrieve the policies from the distributed ledgers and take actions when the accounts access the computing resources (e.g., associated with the distributed ledger). The distributed ledger service may identify access rights to a computing resource associated with an account. The distributed ledger service may then receive a policy record from the distributed ledger. The record may include a policy applicable to the access rights to the computing resource. The distributed ledger service may then apply the policy received from the distributed ledger to the computing resource.

According to one example of the present technology, an account may create a policy that governs a computing resource using a policy creation service. The distributed ledger service may receive metadata from the policy creation service that defines policies applicable to computing resources. In one example, an account of a service provider environment may model a policy using a policy modeling tool to generate the policy metadata. The policy metadata may include one or more policy statements describing: an identifier of a service area, an identifier of a service, an identifier of one or more computing resources, a constraint on the one or more computing resources, and an action to perform with respect to the one or more computing resources.

The distributed ledger service may publish the policy metadata to one or more distributed ledgers when the policy metadata has been authorized by an account of the service provider environment. The distributed ledger service may receive authorization for one or more policies from one or more accounts. An account may authorize a policy by electronically signing the metadata defining the policy. Multiple accounts may authorize the same policy. The distributed ledger service may then generate a transaction to publish an authorized policy to a distributed ledger. The distributed ledger service may publish the transaction to the distributed ledger as a policy record. Thus, the distributed ledger service may enable one account to create a policy to govern the access rights to computing resources of another account without requiring cross-account access. A first account may authorize a policy created by a second account and the distributed ledger service may publish the authorized policy to a distributed ledger of the first account. The first and second accounts may participate in the distributed ledger and receive updates made to the distributed ledger when either account accesses the computing resources governed by the policy.

According to another example of the present technology, the distributed ledger service may maintain data privacy for the distributed ledgers. Since an enterprise may not want to share information between various third parties (SIs and vendors) and even across multiple lines of business, the distributed ledger service may control access to ledger data. The distributed ledger service may implement controls so that only parties within a defined scope of authority can view specific entries. In one example, the distributed ledger service may implement access controls by encrypting entries with keys that are unique to the publisher. The distributed ledger service may be recording the keys in a separate distributed ledger, such as a "secret key ledger." The distributed ledger service may utilize role-based access controls to grant permissions to accounts or entities to read keys from the secret key ledger.

Figure 1B:
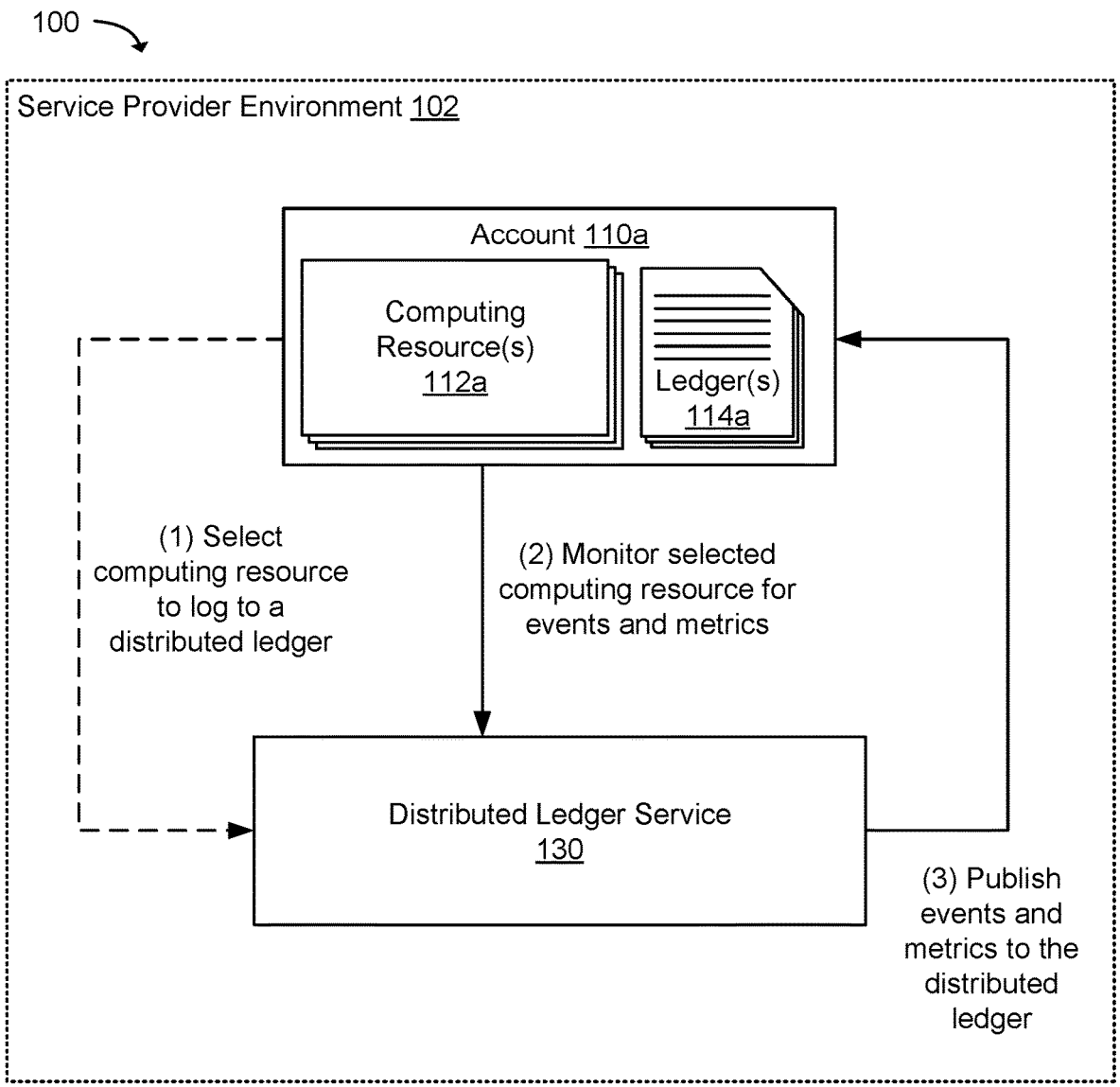
Figure 1C:
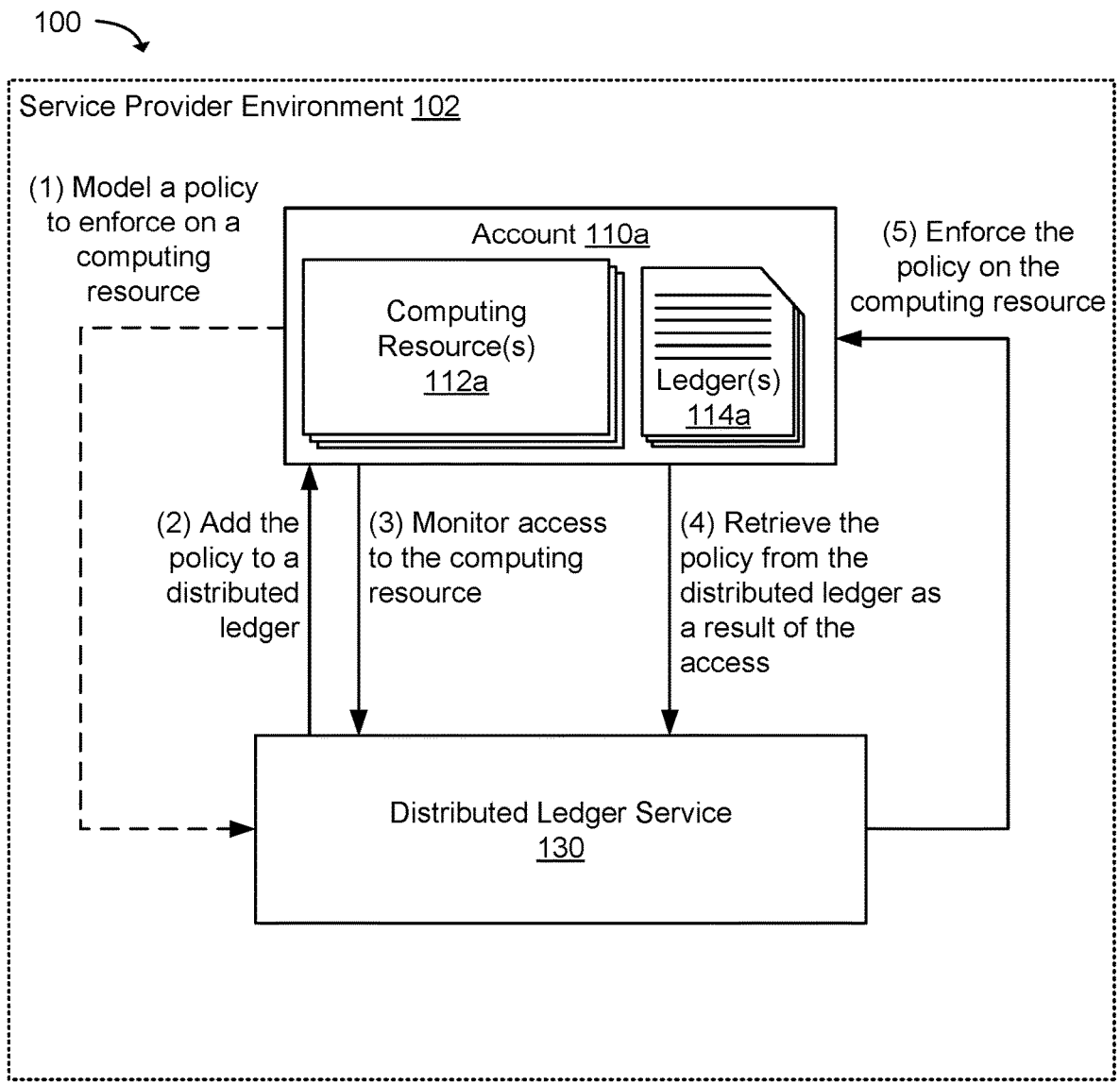

FIGS. 1A-1C are diagrams illustrating an example system 100 and method for distributed governance of computing resources according to one example of the present technology. The system 100 may include a service provider environment 102. As shown in FIG. 1A, the service provider environment 102 may include one or more computing accounts 110, such as the accounts 110a, 110b, 110c, 110d, and 110e. Each of the accounts 110a-110e may include one or more computing resource(s) 112 (e.g., the computing resources 112a, 112b, 112c, 112d, and 112e) and one or more distributed ledger(s) 114 (e.g., the distributed ledgers 114a, 114b, 114c, 114d, and 114e), all of which may be hosted within the service provider environment 102. The service provider environment 102 may employ virtualization that allows physical server computers to each host multiple computing instances (e.g., virtual guest machines) using a hypervisor or another virtualization scheme, and the service provider environment 102 may provide virtualized services. Each computing instance may be a guest machine acting as a distinct logical computing system.

The accounts 110a-110e may be a user account, a customer account, a system account, and the like. The accounts 110a-110e may be an individual account or a shared account. In addition, the accounts 110a-110e may provide access to one or more of the computing resource(s) 112a-112e hosted by the service provider environment 102. The computing resource(s) 112a-112e may include hardware, software, and/or data elements within the service provider environment 102. Some examples of the computing resource(s) 112a-112e may include physical computing systems, virtualized computing systems, processor resources, memory resources, storage resources, networking resources, peripherals, services, software, application programming interfaces (APIs), control planes, data planes, and the like.

The distributed ledger(s) 114a-114e may in a data store service having data that is replicated across several of the accounts 110a-110e. Each of the accounts 110a-110e that participates in one or more of the distributed ledger(s) 114a-114e replicates and saves an identical copy of the ledgers. Each participating account may publish updates to the ledgers independently or may authorize another service to update the ledgers on behalf of the account (e.g., the distributed ledger service 130 as shown in FIG. 1B may perform the updating).

Thus, the distributed ledger(s) 114a-114e may not be maintained by any central authority, although the distributed ledger service 130 may oversee the publication to and the retrieval of data from the distributed ledger(s) 114a-114e on behalf of the accounts 110a-110e. For instance, the distributed ledger(s) 114a-114e may receive updates that are independently constructed and recorded by each of the accounts 110a-110e. In one example implementation, the accounts 110a-110e may vote on the updates to ensure that the majority agrees with a specific conclusion. The voting and agreement on one copy of the ledger may be referred to as consensus and may be conducted automatically by a consensus algorithm. In another example, the distributed ledger service 130 may centrally handle the validation and consensus. Once consensus has been reached, the distributed ledger(s) 114a-114e may be updated and the latest, agreed-upon version of the distributed ledger(s) 114a-114e is saved in each of the accounts 110a-110e separately.

The distributed ledger service 130 (in FIG. 1B) may be a distributed asynchronous application that when executed, coordinates and manages a data store of records that is replicated across a network to a set of accounts, such as the accounts 110a-110e of the service provider environment 102. In one example configuration, a provider and/or a customer of the service provider environment 102 may construct a distributed ledger, such as the distributed ledger(s) 114a-114e, for use by the distributed ledger service 130 to provide an audit trail and govern the computing resource(s) 112a-112e. The distributed ledger(s) 114a-114e may be created by and/or registered with the distributed ledger service 130. For example, the distributed ledger(s) 114a-114e may be registered with the distributed ledger service 130 upon creation of a distributed ledger in an account using the distributed ledger service 130. In another example, the distributed ledger(s) 114a-114e may be registered with the distributed ledger service 130 as an existing distributed ledger by providing an identifier for the distributed ledger(s) 114a-114e and information used to access the distributed ledger(s) 114a-114e. The distributed ledger service 130 may then act as one of the participants and contact accounts (e.g., peer accounts) in the network from which to obtain a copy of the distributed ledger 140.

According to the present technology, the distributed ledger service 130 may receive transactions associated with the accounts 110a-110e and add the transactions as records to the distributed ledger(s) 114a-114e. Some examples of transactions may include events associated with the computing resource(s) 112a-112e.

In one example, the computing resource(s) 112a-112e may be configured to log events to the distributed ledger(s) 114a-114e using the distributed ledger service 130 as shown in FIG. 1B. The distributed ledger service 130 may, in this example, receive a selection of one or more of the computing resource(s) 112a from the account 110a. The account 110a may select the computing resource(s) 112a for which to store log information in one or more distributed ledgers. The computing resource(s) 112a may be configured to send audit log information to the distributed ledger service 130. The account 110a may designate to which of the distributed ledger(s) 114a the logging information is to be published. The distributed ledger service 130 may add the selected computing resources to a watch list used to monitor the selected computing resources.

The distributed ledger service 130 may monitor the selected computing resource(s) 112a for service level events and metrics. The distributed ledger service 130 may receive information associated with the service level events and the metrics and publish the events and metrics to one or more of the distributed ledger(s) 114a. The distributed ledger service 130 may determine to which of the distributed ledger(s) 114a the logging information is to be published. Accordingly, the distributed ledger service 130 may communicate information for an immutable audit log for the computing resource(s) 112a that is shared among all the accounts 110a-110e in the network that participate in the one of the distributed ledger(s) 114a to which the information was published.

In another example, the distributed ledger service 130 may be configured to enforce policies stored to the distributed ledger(s) 114a-114e as shown in FIG. 1C. The distributed ledger service 130 may store policies that govern the computing resource(s) 112a for the account 110a in the distributed ledger(s) 114a. The distributed ledger service 130 may provide an immutable policy store for the computing resource(s) 112a that may also be shared among the accounts 110a-110e in the network. Therefore, the account 110a may be subject to a policy created by the account 110b and published to one of the distributed ledger(s) 114a without requiring cross account access between accounts 110a and 110b.

According to one example of the present technology, a user or administrator associated with the accounts 110a-110e may create a policy to enforce with respect to the one or more of the computing resource(s) 112a-112e. The account 110a, for example, may model the policy using a variety of tools, such as text editors and graphical user interfaces. In one configuration, the account 110a may create metadata that defines a policy. The metadata may include one or more policy statements. A policy statement may identify a service area of the computing resource, a service provided by the computing resource, the computing resource, a constraint on the computing resource, an action not allowed to be performed and an action allowed to be performed with respect to the computing resource. Some examples of a service area of the computing resource may include processing, storage, networking, administration, and the like. Some examples of a service provided by the computing resource may include processing in a computing instance, data storage in a data store, networking through a gateway, load distribution through a load balancer, identity and access management, and the like. Some examples of a type of the computing resource may include a CPU type, a memory type, a storage type, a network port, an account, and the like.

A policy statement may include a constraint on a computing resource. A constraint may include allowed or disallowed configurations of the computing resource. For example, a constraint may dictate that ports 80 and 443 of a network port be open and allowed. In another example, a constraint may dictate that all users accounts have two factor authorization enabled. Subject to one or more constraints, the policy statement may include an action to perform with respect to the computing resource. The action may be performed when a constraint is satisfied. Otherwise, the action may be performed when a constraint is not met. In another example, the constraint may be a number of transactions an account may send to a computing resource or a data table that may not be written to in the computing resources.

The following Table 1 provides examples of policy statements according to the present technology:

TABLE 1

| Service Area | Service | Resource | Constraint | Action |
|---|---|---|---|---|
| Networking | ALB, ELB, API Gateway | Port | {Allow | 80, 443} | {Port -> Disable} |
| Administration | Account | Account | {Enable | Feature -> Two Factor Auth}, {Enable | Service -> Guard Duty} | {Account -> Disable} |

After the user or administrator associated with the account 110*a* has modeled a policy to enforce with respect to the one or more of the computing resource(s) 112*a*, the policy may be authorized prior to becoming enforceable. In one example, the account 110*a* may authorize a policy by electronically signing the metadata defining the policy to enable the distributed ledger service 130 to publish the policy to one or more of the distributed ledger(s) 114*a*. The account 110*a* may provide a digital signature that cryptographically verifies that the account 110*a* has authorized the policy. The digital signature may further provide a link used by the distributed ledger server 130 to add the signed policy to a distributed ledger associated with the computing account 110*a*. The distributed ledger service 130 may receive authorization for a policy from one or more of the accounts 110*a*-110*e* to add the policy to one or more of the distributed ledger(s) 114*a*-114*e* associated with the accounts 110*a*-110*e*. The digital signatures of at least two of the accounts 110*a*-110*e* may provide a link used by the distributed ledger server 130 to determine to which of the distributed ledger(s) 114*a*-114*e* the policy is to be published. The distributed ledger service 130 may publish the policy to a distributed ledger to which each digital signer of the policy is a participant.

The distributed ledger service 130 may generate a transaction in order to publish the authorized policy to one or more of the distributed ledger(s) 114*a* associated with the account 110*a*. The transaction may include the policy metadata and the authorization for the policy. The distributed ledger service 130 may then publish the transaction to the distributed ledger associated with the account as a policy record.

Accordingly, any one of the accounts 110*a*-110*e* (FIG. 1A) may create policy metadata that governs the computing resource(s) 112*a*-112*e* hosted by the service provider environment 102. The account 110*a* may agree to have a policy created by the account 110*b* enforced with respect to the computing resource(s) 112*a* owned or otherwise under the control of the account 110*a* by authorizing the policy. The distributed ledger service 130 may publish the authorized policy to one of the distributed ledger(s) 114*a*. The distributed ledger may be a distributed ledger to which the accounts 110*a* and 110*b* are participants, thus, the update to the distributed ledger with the authorized policy may be replicated to one of the distributed ledger(s) 114*b* held by the account 110*b* to provide immutable proof that the account 110*a* has authorized the policy.

According to the present technology, the distributed ledger service 130 may further retrieve the policy from the one of the distributed ledger(s) 114*a* to later enforce the policy with respect to the computing resource(s) 112*a*. The distributed ledger service 130 may initiate one or more searches of the distributed ledger(s) 114*a* in response to an access of the computing resource(s) 112*a* by the account 110*a*. The distributed ledger service 130 may receive a request for policy records in real time or during an audit log review of the computing resource(s) 112*a*. In one example, the distributed ledger service 130 may enforce the policies defined in retrieved policy records or forward the policies to another service for enforcement with respect to the computing resource(s) 112*a*.

Figure 2A:
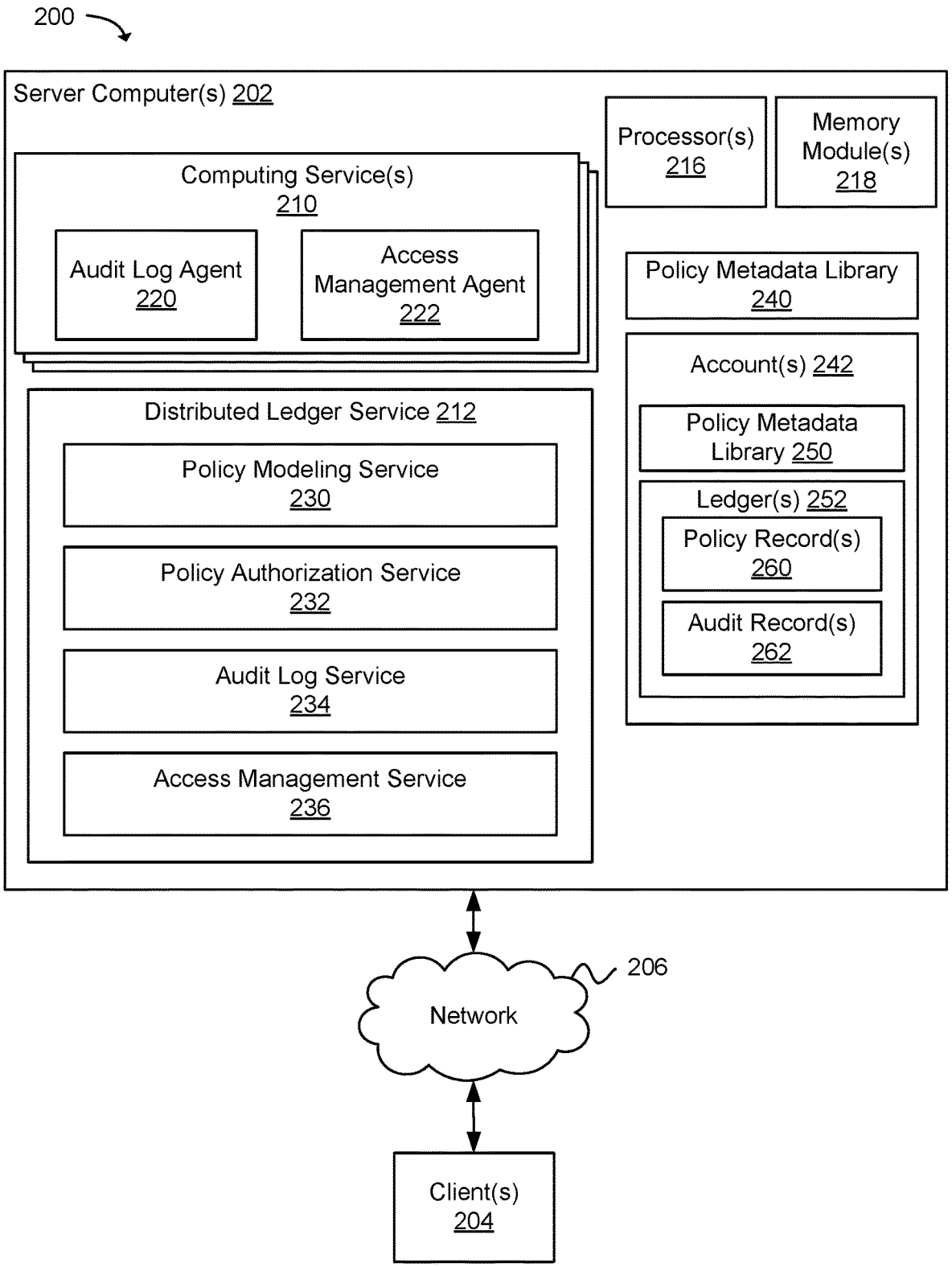
FIGS. 2A-2B are block diagrams that illustrate various example components included in a system for distributed governance of computing resources according to one example of the present technology.
Figure 2B:
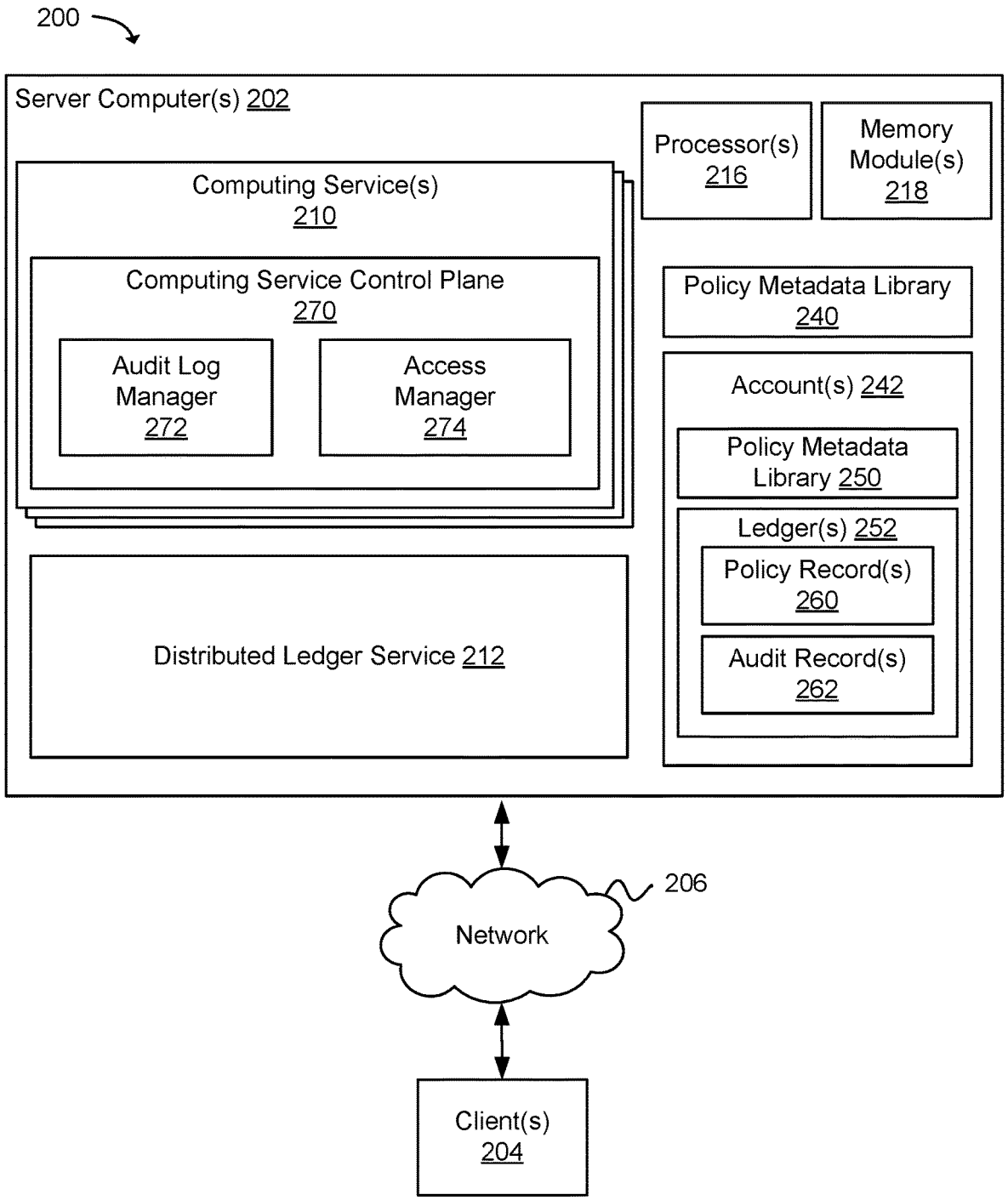

FIGS. 2A-2B are block diagrams that illustrates various example components included in a system 200 for distributed governance of computing resources according to one example of the present technology. As illustrated, the system 200 may include one or more server computer(s) 202 that may interact with one or more client(s) 204 via a network 206. In this example, the server computer(s) 202 may include one or more computing service(s) 210 and a distributed ledger service 212. Some examples of the computing service(s) 210 may include processing services, memory services, storage services, networking services, administrative services, control services, data services, software services, application services, platform services, and the like. The computing service(s) 210 may be computing resources according to one example of the present technology. Additionally, the computing service(s) 210 may provide access to one or more computing resources.

According to one example of the present technology, the server computer(s) 202 may contain one or more services used in storing and/or retrieving policy records from distributed ledgers associated with computing accounts. As illustrated in FIG. 2A, the computing service(s) 210 may be configured to utilize the distributed ledger service 212 to store log data. For example, the computing service(s) 210 may include an audit log agent 220. The audit log agent 220 may generate a log of events and metrics associated with the computing service(s) 210. Some examples of the events and metrics may include access events, function calls, application programming interface (API) calls or request, resource state, resource utilization, and the like. The audit log agent 220 may record, for example, an access made with respect to the computing service(s) 210, report periodically on the status of the computing service(s) 210, capture the state of the computing service(s) 210, and the like. The audit log agent 220 then may send log information to the distributed ledger service 212. The log information sent to the distributed ledger service 212 may form part of an immutable audit log that can be replicated and made available using a distributed ledger to other accounts within the system 200 that participate in the distributed ledger.

In another example, the computing service(s) 210 may be configured to utilize the distributed ledger service 212 to govern access rights for accounts within the system 200. The computing service(s) 210 may include an access management agent 222 for use with the distributed ledger service 212. In one example, the access management agent 222 may determine whether an access has occurred with respect to the computing service(s) 210. The access management agent 222 may monitor the computing service(s) 210 in real time to intercept or handle access to the computing service(s) 210. In an alternative configuration, the access management agent 222 may periodically audit the computing service(s) 210 for prior accesses or stored content. In another example, the access management agent 222 may forward the requests for access to the computing service(s) 210 directly to the distributed ledger service 212. The access management agent 222 may send the requests for access to the computing service(s) 210 indirectly or directly to the distributed ledger service 212, such as via an identity and access management service.

The access management agent 222 may request policy records from the distributed ledger service 212 that govern the access made with respect to the computing service(s) 210. Upon identifying an access to the computing service(s) 210, the access management agent 222 may request and receive one or more policies from the distributed ledger service 212 that have been published to a distributed ledger. The access management agent 222 may enforce or cause to be enforced the policies retrieved from the distributed ledger with respect to the computing service(s) 210. For example, an account utilizing one of the computing service(s) 210 as a storage service may be subject to a policy where commonly accessible storage (e.g., across multiple accounts) is read only. The access management agent 222 may automatically enforce the policy by setting the read only attribute of the computing service(s) 210 on behalf of the account. In another example, an account utilizing one of the computing service(s) 210 as a storage service may be subject to a policy that personally identifiable information (PII) may never be open to the public. The access management agent 222 may automatically enforce the policy by revoking any public access to the computing service(s) 210 upon detecting that PII has be stored by the account. In yet another example, an account utilizing one of the computing service(s) 210 as a networking service to provide load balancing may be subject to a policy that only ports 80 and 443 be open. The access management agent 222 may automatically enforce the policy by closing any ports other than ports 80 and 443.

Accordingly, the audit log agent 220 and the access management agent 222 may utilize the distributed ledger service 212 to enforce proactive governance with respect to the computing service(s) 210. The distributed ledger service 212 may include a policy modeling service 230, a policy authorization service 232, an audit log service 234, and an access management service 236. The policy modeling service 230 may be utilized by accounts to create one or more policies that govern the computing service(s) 210. A user may interact with an application that presents a user interface (e.g., a browser console or web console) for defining one or more policy statements. The policy statements may be stored as metadata within a policy metadata library 240. The policy metadata library 240 may include metadata that defines policies that have been previously created by one or more users or accounts. The policy metadata library 240 may be used as a template repository allowing the metadata of various policies to be reused or repurposed by other users, accounts, or ledgers. Users may store policy statements as metadata within a policy metadata library 250 associated with the account(s) 242.

The policy authorization service 232 may be utilized to authorize one or more policies in order that the policies govern the computing service(s) 210. A user may interact with an application that presents a user interface for authorizing one or more policies stored in the policy metadata library 240 or the policy metadata library 250. The user may authorize a policy by associating the policy with one or more of the account(s) 242 or the distributed ledger(s) 252. In one example, one of the account(s) 242 may digitally sign the metadata of a policy. In another example, the account(s) 242 may include a token with the policy. The policy authorization service 232 may utilize the authorization to link the policy to the account(s) 242. The policy authorization service 232 may publish the policy to one or more of the distributed ledger(s) 252 associated with the account(s) 242. For example, the policy authorization service 232 may generate a policy record and add the policy record to one or more distributed ledger(s) 252. The policy authorization service 232 may add the policy records to existing policy record(s) 260.

The audit log service 234 may be utilized to add log information associated with the computing service(s) 210 to the distributed ledger(s) 252. The audit log service 234 may receive log information from the audit log agent 220. The audit log service 234 may prepare the log information as an audit record and publish the audit record to one or more of the distributed ledger(s) 252 as audit record(s) 262. The audit log service 234 may determine which of the account(s) 242 is associated with the log information in order to publish the audit record(s) 262 to the distributed ledger(s) 252.

The access management service 236 may be utilized to apply the policy record(s) 260 to the computing service(s) 210. In one example, the access management service 236 may retrieve one or more of the policy record(s) 260 from the distributed ledger(s) 252 in response to a request for access by one of the account(s) 242 to the computing service(s) 210. Using information about the request for access this is provided by the access management agent 222 of the computing service(s) 210, the access management service 236 may identify one or more of the account(s) 242 and the computing service(s) 210 involved in the access. The access management service 236 may initiate one or more searches of the distributed ledger(s) 252 to obtain one or more of the policy record(s) 260 that are applicable to the account(s) 242 and the computing service(s) 210 involved in the access. In one example, the access management service 236 may query the distributed ledger(s) 252 for the policy record(s) 260 that are authorized by the account(s) 242 involved in the request for access from the access management agent 222. In another example, the access management service 236 may query the distributed ledger(s) 252 for the policy record(s) 260 that govern the computing service(s) 210 involved in the request for access from the access management agent 222.

The access management service 236 may receive one or more of the policy record(s) 260 in response to the searches. The access management service 236 may send the policy record(s) 260 received in response to the searches to the access management agent 222 for evaluation. The access management service 236 may alternatively evaluate one or more policy statements included in the policy record(s) 260 received in response to the searches. The access management service 236 may translate the policy record(s) 260 into commands understood by the access management agent 222 and the computing service(s) 210.

The access management agent 222 may apply the policy to the computing service(s) 210 involved in the request for access. In one example, the access management agent 222 may evaluate policy statements in the policy record(s) 260 and determine whether the policy statements are satisfied. The access management agent 222 may evaluate a condition defined within the policy record(s) 260 to determine whether the request for access satisfies the condition. If the condition has been satisfied, the access management agent 222 may perform an action within the defined within the policy record(s) 260. The action may include allowing or denying the request for access.

The access management agent 222 may also log the application of the policy to the computing service(s) 210 using the distributed ledger service 212. The access management agent 222 may send the results of applying the policy to the audit log service 234. The audit log service 234 may publish the results of applying the policy to the distributed ledger(s) 252.

According to one example of the present technology, the audit log agent 220 and the access management agent 222 may be software agents installed onto one or more server computers providing the computing service(s) 210. As illustrated in FIG. 2B, the computing service(s) 210 may natively utilize the distributed ledger service 212 to enforce proactive governance using distributed ledgers. Each of the computing service(s) 210 may include a computing service control plane 270 that manages interaction between internal components a computing service as well as between a client and the computing service. The computing service control plane 270 may include an audit log manager 272 and an access manager 274.

The audit log manager 272 may manage how the computing service control plane 270 facilitates the logging of information. The audit log manager 272 may support one or more logging destinations, such as the distributed ledger service 212 or another distributed storage location. The access manager 274 may manage how the computing service control plane 270 facilitates access management. The access manager 274 may support one or more identity and access management services, such as requesting distributed ledger policies from the distributed ledger service 212. According to this example, the computing service control plane 270 enables the computing service(s) 210 natively support policy enforcement for distributed ledgers using policies retrieved from distributed ledgers associated with the account(s) 242.

The various processes and/or other functionality contained within the system 200 may be executed on one or more processors 216 that are in communication with one or more memory modules 218. The system 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of a data store may include storage systems such as a SAN (Storage Area Network), cloud storage network, volatile or non-volatile RAM, optical media, or hard-drive type media. The data store may be representative of a plurality of data stores as can be appreciated.

The network 206 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIGS. 2A-2B illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIGS. 2A-2B illustrate examples of a system that may implement the techniques above, many other similar or different environments are possible. The example environments discussed and illustrated above are merely representative and not limiting.

Figure 3:
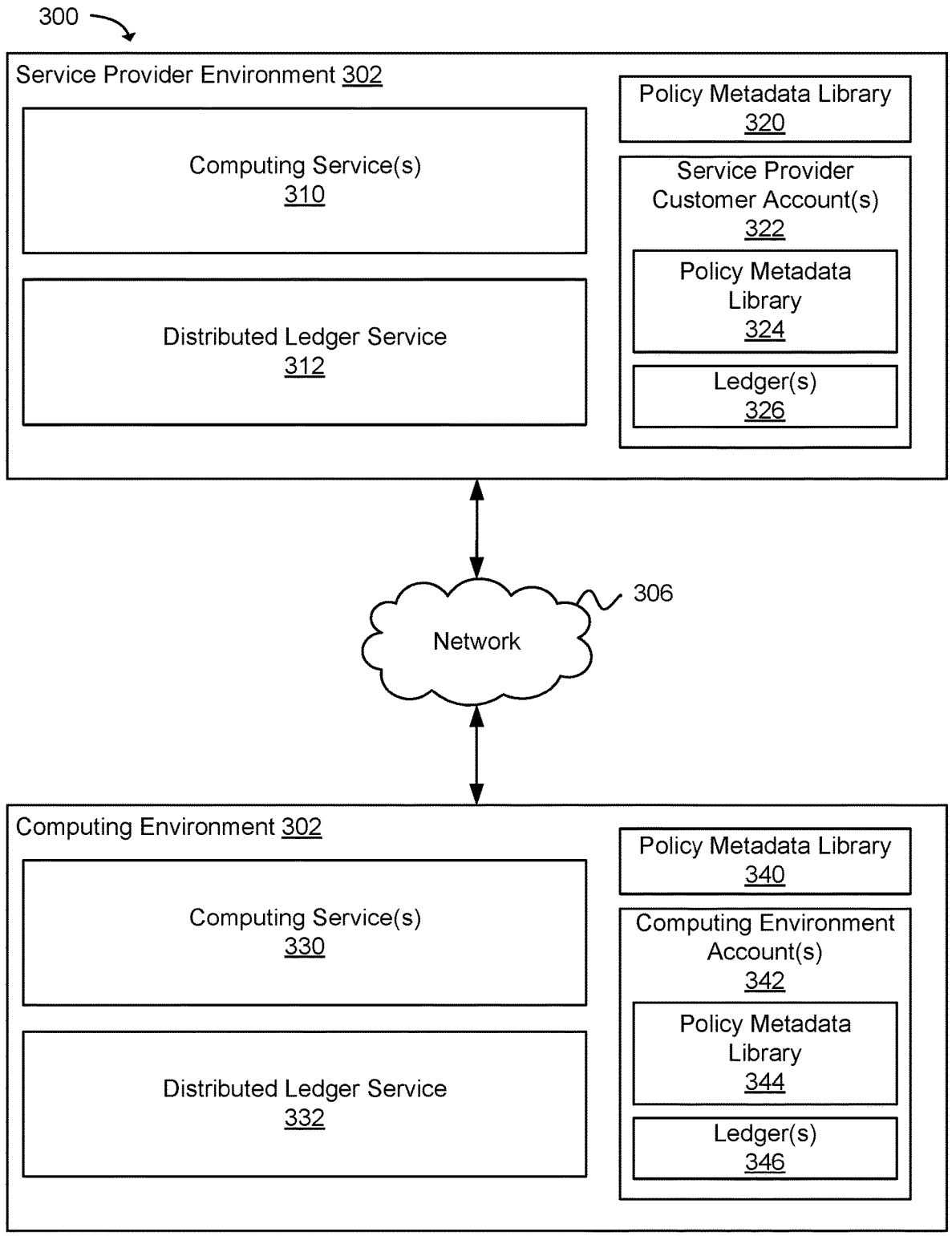
FIG. 3 is a block diagram illustrating an example service provider environment and data center environment that includes a distributed ledger service according to one example of the present technology.

FIG. 3 is a block diagram illustrating an example system 300 with a service provider environment 302 and a computing environment 304 that include distributed ledger services 312, 332 according to one example of the present technology. As illustrated, the service provider environment 302 and the computing environment 304 are in communication using a network 306. In one example, the service provider environment 302 may be operated by a service provider that offers computing services. The service provider environment 302 may include one or more computing service(s) 310 and a distributed ledger service 312. The computing service(s) 310 may be configured to utilize the distributed ledger service 312, for example, a dictated by a control plane or utilizing an audit log agent and an access management agent as discussed with respect to FIGS. 2A-2B. The service provider environment 302 may include a policy metadata library 320 and one or more service provider customer account(s) 322. The service provider customer account(s) 322 may include a policy metadata library 324 and one or more distributed ledger(s) 326.

The service provider environment 302 may utilize the distributed ledger service 312 to provide access to the distributed ledger(s) 326 associated with the service provider customer account(s) 322. The distributed ledger service 312 may publish log information obtained from the computing service(s) 310 to the distributed ledger(s) 326. The distributed ledger service 312 may ensure that the log information is published to the distributed ledger(s) 326 and replicated across networks to accounts in the networks. According to another example of the present technology, the distributed ledger service 312 may publish policies authorized by the service provider customer account(s) 322 to the distributed ledger(s) 326. The distributed ledger service 312 may ensure that the authorized policies are published with the distributed ledger(s) 326 and replicated across networks to accounts in the networks.

The distributed ledger service 312 may facilitate the enforcement of policies with respect to the computing service(s) 310 or the service provider customer account(s) 322. For example, the computing service(s) 310 may be configured to send access requests to the distributed ledger service 312 for applicable policies stored in distributed ledgers. In another example, the distributed ledger service 312 may monitor the computing service(s) 310 for access requests and intercept the requests prior to handling by the computing service(s) 310 (e.g., to determine whether the requests may be allowed, denied, logged, etc.).

The distributed ledger service 312 may initiate one or more searches of the distributed ledger(s) 326 in response to the access request. The distributed ledger service 312 may search the distributed ledger(s) 326 to obtain policies that govern the service provider customer account(s) 322 and the computing service(s) 310. The distributed ledger service 312 may directly or indirectly enforce polices obtained from the distributed ledger(s) 326.

The computing environment 304 may include one or more computing service(s) 330 and a distributed ledger service 332. The computing environment 304 may include a policy metadata library 340 and one or more computing environment account(s) 342. The computing environment account(s) 342 may include a policy metadata library 344 and one or more distributed ledger(s) 346. The local computing environment accounts 342 may also be linked to individual service provider customer accounts 322 or be mirrors of the local computing environment accounts 342.

The computing environment 304 may include edge servers that provide computing services to Internet of Things (IoT) devices. The computing environment 304 may locally process data received from one or more IoT devices using the computing service(s) 330. The computing environment 304 may forward unprocessed or processed data received from one or more IoT devices to the service provider environment 310 for use by the computing service(s) 310.

The computing environment 304 may utilize the distributed ledger service 332 to provide access to the distributed ledger(s) 346 associated with the computing environment account(s) 342. The distributed ledger service 332 may log information obtained from the computing service(s) 330 to the distributed ledger(s) 346. The distributed ledger service 332 may ensure that the log information is published to the distributed ledger(s) 346 and replicated across networks to accounts in the networks. According to another example of the present technology, the distributed ledger service 332 may publish policies authorized by the computing environment account(s) 342 to the distributed ledger(s) 346. The distributed ledger service 332 may ensure that the authorized policies are published to the distributed ledger(s) 346 and replicated across networks to accounts in the networks.

The distributed ledger service 332 may facilitate the enforcement of policies with respect to the computing resource(s) 330 or the computing environment account(s) 342. For example, the computing service(s) 330 may be configured to send access requests to the distributed ledger service 332 for applicable policies stored in distributed ledgers. In another example, the distributed ledger service 332 may monitor the computing service(s) 330 for access requests and intercept the requests prior to handling by the computing service(s) 330. The distributed ledger service 332 may initiate one or more searches of the distributed ledger(s) 346 to obtain policies that govern the computing environment account(s) 342 and the computing service(s) 330. The distributed ledger service 332 may directly or indirectly enforce polices obtained from the distributed ledger(s) 346.

According to the present technology, the distributed ledger service 312 and the distributed ledger service 332 may act individually or may coordinate to access the distributed ledgers 326, 346 across the network 306. The distributed ledger services 312, 332 may log information obtained from the computing services 310, 330 to both of the distributed ledgers 326, 346. The distributed ledger services 312, 332 may initiate one or more searches of the distributed ledgers 326, 346 to obtain policies that govern either or both of the service provider customer account(s) 322, the computing environment account(s) 342, and the computing services 310, 330.

Figure 4:
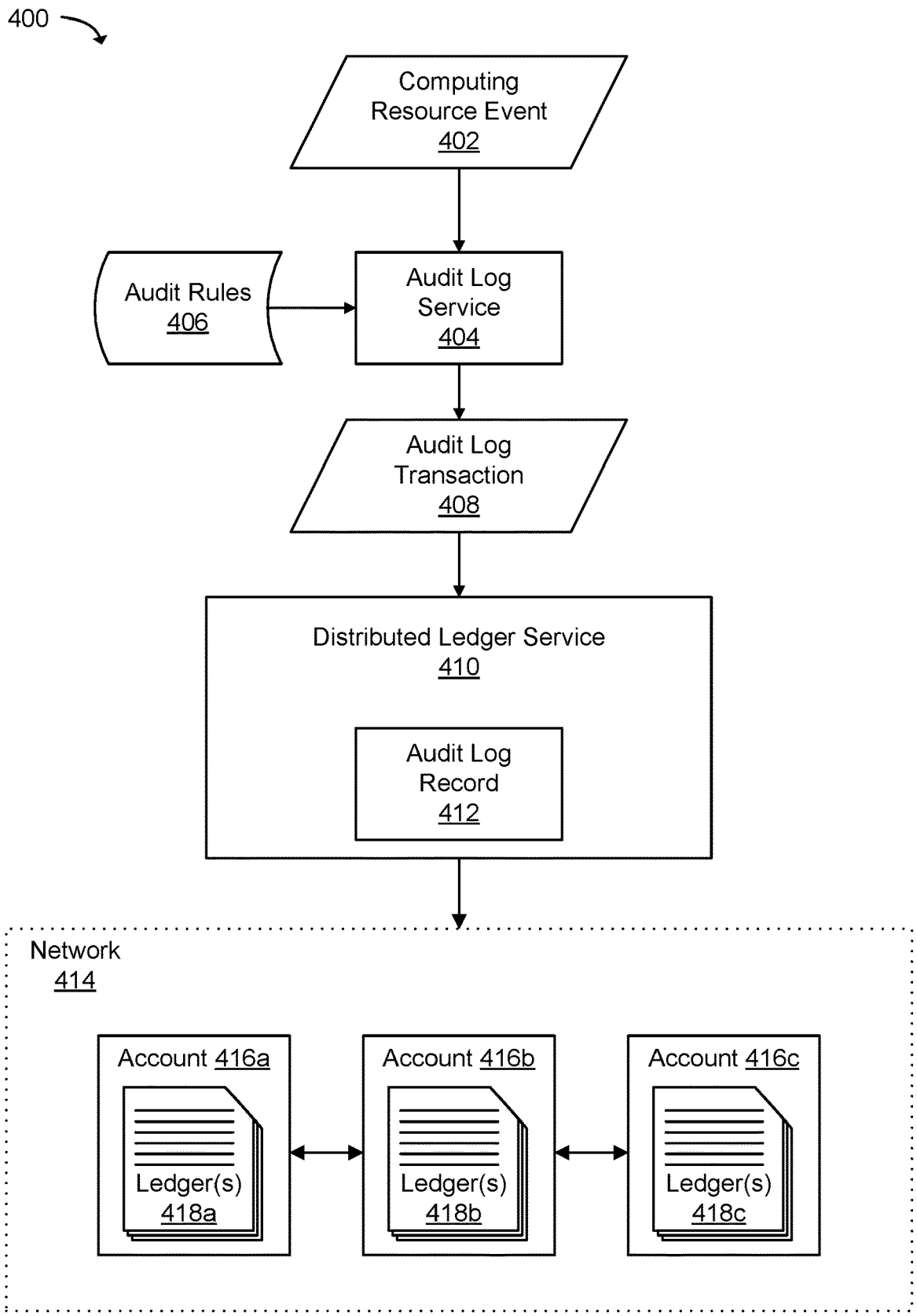
FIG. 4 is a flow diagram illustrating an example method for publishing an audit log to a distributed ledger using a distributed ledger service according to one example of the present technology.

FIG. 4 is a flow diagram illustrating an example method 400 for publishing an audit log to a distributed ledger using a distributed ledger service according to one example of the present technology. The method 400 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 400 may enable auditors to have automatic access to the ledger data. An enterprise InfoSec and auditors may perform forensic analysis of the ledger data to detect any non-compliance or breeches of policies.

In this example, a computing resource event 402 is received by an audit log service. The computing resource event 402 may include an event associated with a computing resource. The computing resource event 402 may include an event triggered by operation of the computing resource. For example, the computing resource event 402 may include an event resulting from performance of an action or service provided by the computing resource. In another example, the computing resource event 402 may include an event triggered by an operation on the computing resource. The computing resource event 402 may include an event associated with an account access made to the computing resource.

One or more audit rules 406 may be applied to the computing resource event 402. The audit rules 406 may include one or more rules defining when the computing resource event 402 is to be logged by the audit log service 404. The audit rules 406 may filter events with specified types, sources, triggers, contents, and the like from processing by the audit log service 404. In another example, the audit rules 406 may format the computing resource event 402 for processing by the audit log service 404. Accordingly, using the audit log rules 406, the audit log service 404 generates an audit log transaction 408 using the computing resource event 402.

The audit log transaction 408 may include log information associated with the computing resource event 402. The audit log transaction 408 may further include additional metadata obtained by the audit log service 404, such as time stamps, state information, correlated information, and the like. The audit log transaction 408 may be formatted according to one or more specifications for storing log information to a particular distributed ledger.

A distributed ledger service 410 may receive the audit log transaction 408 and create an audit log record 412 for one or more of distributed ledgers using the audit log transaction 408. The audit log record 412 may be the result of a verification algorithm that verifies the audit log transaction 408. The audit log record 412 may include the audit log transaction 408 or data obtained therefrom. The distributed ledger service 410 may publish the audit log record 412 to one or more distributed ledgers in a network 414, such as the distributed ledgers 418a-418c of one or more accounts 416a-416c. The audit log record 412 may be added to the distributed ledgers 418a-418c individually or together with a collection of other records as a block. The distributed ledger service 410 may index the audit log record 412 into the distributed ledgers 418a-418c in order to facilitate a quicker subsequent retrieval.

According to the present technology, an update to any one of the distributed ledgers 418a-418c in the network 414 may be replicated to the other copies of the distributed ledgers 418a-418c in the network 414. Therefore, the accounts 416a-416c may each maintain an individual copy of the audit log record 412 as published to any one of the distributed ledgers 418a-418c in the network 414. In one configuration, the distributed ledger service 410 may provide the verification and consensus allowing the accounts 416a-416c to agree that the audit log record 412 be added to the network 414. In another configuration, the accounts 416a-416c may each individual verify the audit log record 412 and thereafter come to a consensus to add the audit log record 412 to the network 414.

Figure 5:
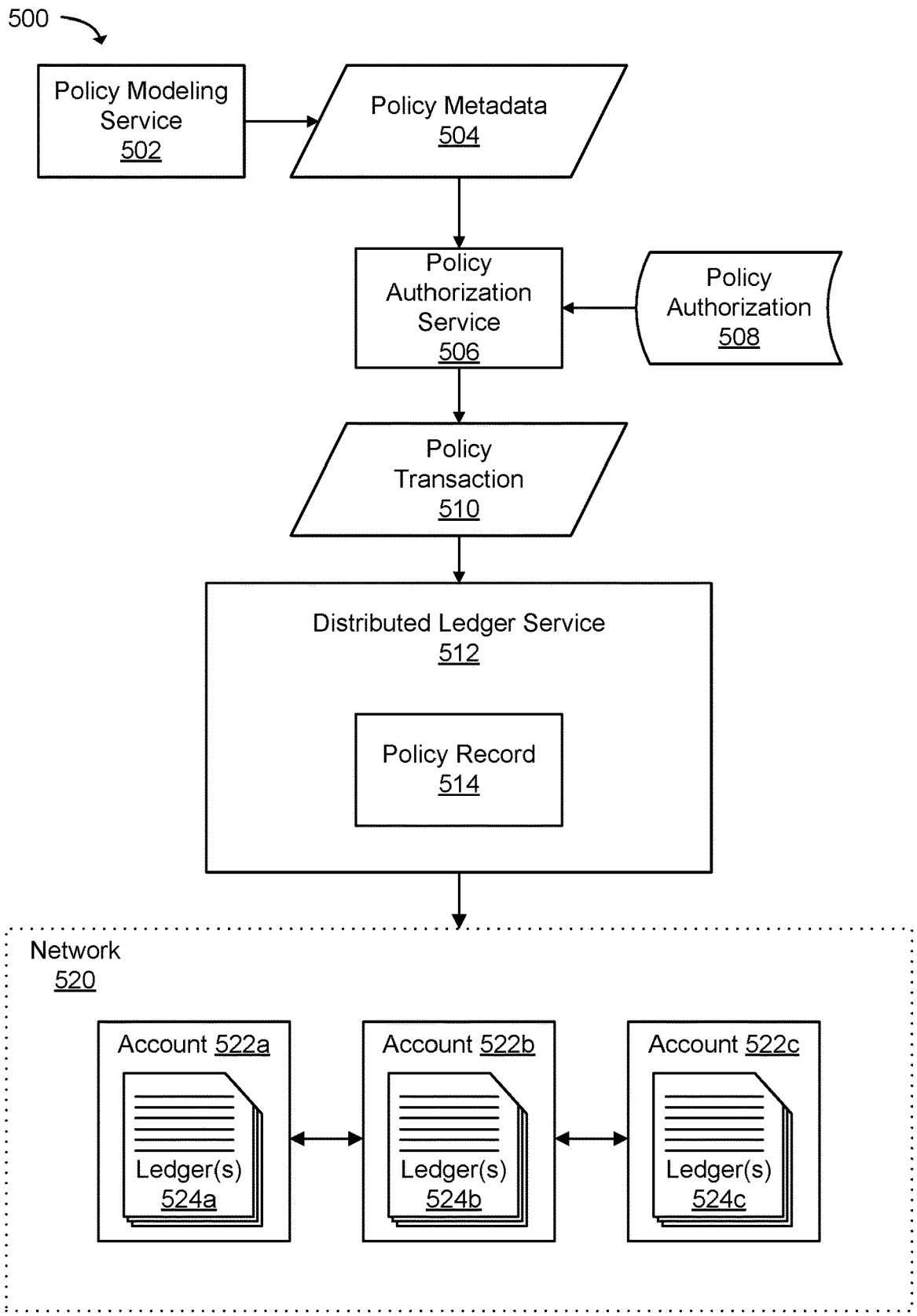
FIG. 5 is a flow diagram illustrating an example method for publishing policies that govern computing resources to a distributed ledger using a distributed ledger service according to one example of the present technology.

FIG. 5 is a flow diagram illustrating an example method 500 for publishing policies that govern computing resources to a distributed ledger using a distributed ledger service according to one example of the present technology. The method 500 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 500 enables proactive governance of computing resources.

In this example, a policy modeling service 502 generates policy metadata 504. A customer or administrator of a service provider environment may utilize the policy modeling service 502 to create one or more policies that govern computing resources. The policies may include one or more policy statements captured as the policy metadata 504. The policy metadata 504 then may be received at a policy authorization service 506.

The policy authorization service 506 may further receive a policy authorization 508. The policy authorization service 506 may receive the policy authorization 508 from the account of the customer or administer of the service provider environment that created the policy metadata 504. In another example, the policy authorization service 506 may receive the policy authorization 508 from an account different from the account that created the policy metadata 504. An enterprise, for example, may create the policy metadata 504 to enforce a policy when accounts owned by business units within the enterprise access the computing resources. The accounts owned by business units within the enterprise may provide the policy authorization 508 to become subject to the policy metadata 504. The enterprise further may create the policy metadata to enforce a policy when third parties, such as contractors and vendors, access the computing resources. The accounts owned by third parties and vendors that provide services to the enterprise may provide the policy authorization 508 to become subject to the policy metadata 504.

The policy authorization 508 may include one or more authorizations of the policy described by the policy metadata 504. For example, the policy authorization 508 may include a digital signature of a user or administrator having an account with a service provider environment. The policy authorization 508 may also include a token that links an account to the policy described by the policy metadata 504. The policy authorization 508 may include multiple digital signatures, tokens, account identifiers, or other authorization mechanisms that enable the verification of the identity of an authorizing party.

The policy authorization service 506 may use the policy metadata 504 and the policy authorization 508 to generate a policy transaction 510. The policy transaction 510 may further include additional metadata obtained by the policy authorization service 506, such as time stamps, state information, correlated information, and the like. The policy transaction 510 may be formatted according to one or more specifications for storing policy documents to a particular distributed ledger.

A distributed ledger service 512 may receive the policy transaction 510 and create a policy record 514 for one or more of distributed ledgers using the policy transaction the policy record 514 may be the result of a verification algorithm that verifies the policy metadata 504 and the policy authorization 508 of the policy transaction 510. The policy record 514 may include the policy transaction 510 or data obtained therefrom. The distributed ledger service 512 may publish the policy record 514 to one or more distributed ledgers in a network 520, such as the distributed ledgers 524a-524c of one or more accounts 522a-522c. The policy record 514 may be added to the distributed ledgers 524a-524c individually or together with a collection of other records as a block. The distributed ledger service 512 may index the policy record 514 into the distributed ledgers 524a-524c in order to facilitate a quicker subsequent retrieval.

According to the present technology, an update to any one of the distributed ledgers 524a-524c in the network 520 may be replicated to the other distributed ledgers 524a-524c. Therefore, the accounts 522a-522c may each maintain an individual copy of the policy record 514 as published to any one of the distributed ledgers 524a-524c in the network 520. In one configuration, the distributed ledger service 512 may provide the verification and consensus allowing the accounts 522a-522c to agree that the policy record 514 be added to the network 520. In another configuration, the accounts 522a-522c may each individual verify the policy record 514 and thereafter come to a consensus to add the policy record 514 to the network 520.

Figure 6:
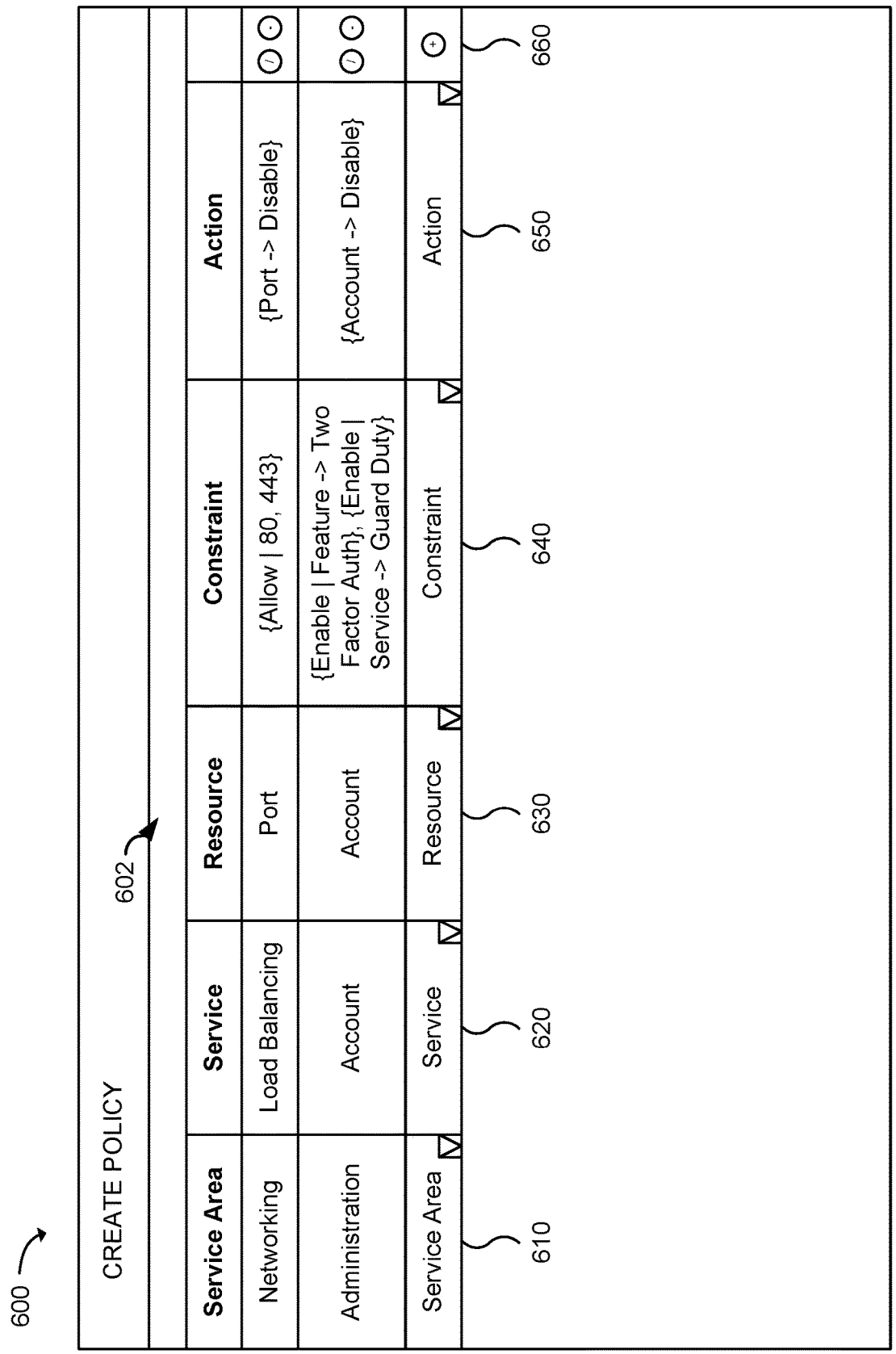
FIG. 6 is a diagram illustrating an example policy modeling console that may be used by customers to create policy metadata according to one example of the present technology.

FIG. 6 is a diagram illustrating an example policy modeling console 600 that may be used by customers to create policy metadata according to one example of the present technology. The policy modeling console 600 may include one or more graphical user interface elements that enable a user to create one or more policies for use with a distributed ledger service according to the present technology.

In this example, the policy modeling console 600 may include a listing of one or more policies 602. Each of the policies 602 may be defined according to one or more policy statements that identify a service area 610 of the computing resource, a service 620 provided by the computing resource, the computing resource 630, a constraint 640 on the computing resource, and an action 650 to perform with respect to the computing resource. A user may create a policy from a drop down menu making a selection from the fields 610, 620, 630, 640, and 650 or providing other user input.

When a policy has been created, the user may save to policy to a policy metadata library. The policy may be retrieved from the policy metadata library and editor or adapted for use by other users. A user may authorize the policy to govern a specified computing resource. The policy may be authorized using one or more methods that link the policy to an account. For example, a user may authorize a policy by digitally signing the policy with a digital signature associated with the user's account. In another example, the user may authorize the policy simply by creating the policy under the user's account.

An authorized policy may be published to a distributed ledger associated with the user's account. The distributed ledger may include policy records that have been authorized by the user's account. The distributed ledger may also include additional information associated with the user. For example, the distributed ledger may include log information collected from one or more computing resources accessed by the account. The distributed ledger may further include the results of applying and enforcing policies with respect to computing resources on behalf of the account.

Figure 7:
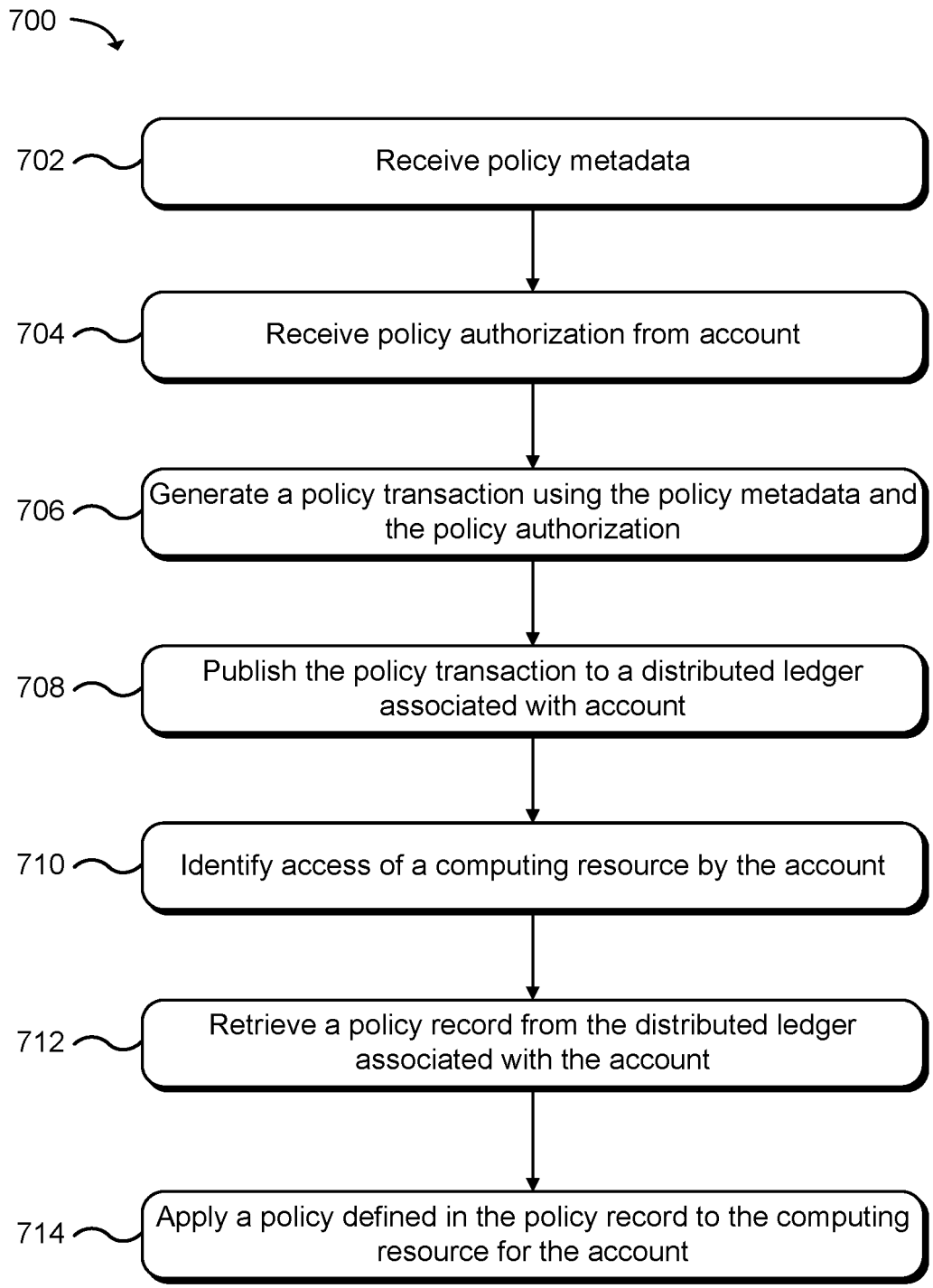
FIG. 7 is a flow diagram illustrating an example method for creating and publishing policies to a distributed ledger that govern computing resources using a distributed ledger service according to one example of the present technology.

FIG. 7 is a flow diagram illustrating an example method 700 for creating and publishing policies that govern computing resources to a distributed ledger using a distributed ledger service according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, a distributed ledger service may receive policy metadata. The policy metadata may be created by a user or administrator of a computing resource. The policy metadata may include one or more policy statements that identify at least a condition and an action. In operation 704, the distributed ledger service may receive a policy authorization for the policy metadata. The policy authorization may include information that links a policy defined by the policy metadata to an account. The policy authorization may include a digital signature resulting from an account holder digitally signing the policy metadata. The policy authorization may include other tokens, references, and links that provide an association between an account and the policy.

In operation 706, the distributed ledger service may generate a policy transaction using the policy metadata and the policy authorization. The distributed ledger service may generate a policy record formatting the policy metadata and the policy authorization according to a specification to enable storing of policies in one or more distributed ledgers. The specification may define the arrangement and format of policy statements from the policy metadata. The specification may further define if and how the policy authorization is arranged in the policy record. One example specification may include a policy record template that provides a header section specifying a set of header attributes, a statement section specifying a set of policy statements, and an authorization section. The header section may provide key-value pairs indicating version information, creation metadata, policy description metadata, policy revision metadata, and the like. The statement section may provide a listing of policy statements. The listing may be ordered, unordered, prioritized, organized, unorganized, and the like. The authorization section may include authorization attributes, authorization keys, digital signatures, and the like.

In operation 708, the distributed ledger service may publish the policy transaction to a distributed ledger associated with the account. The distributed ledger service may identify one or more distributed ledgers associated with the account using the policy authorization that links the policy metadata to an account. According to the present technology, the policy authorization may link multiple accounts to the policy metadata. Thus, the distributed ledger service may determine to publish the policy transaction to a single distributed ledger to which the multiple accounts have access. The distributed ledger service may select a distributed ledger and perform one or more operations to publish the policy transaction to the selected distributed ledger.

The distributed ledger service may implement a verification scheme in order to verify that the policy transaction is allowed to be published to the distributed ledger as a policy record. For example, the distributed ledger service may verify that the digital signature included in the policy transaction is associated with a valid account. In another example, the distributed ledger service may implement a consensus procedure in order to establish whether other accounts in a network that participate in the distributed ledger consent to addition of the policy transaction to the network. The accounts may come to a consensus with respect to the order that the policy transaction is added on the ledger. The ordering that a policy is added to a network may provide one mechanisms for determine the priority given to the policy over another policy in the network.

The distributed ledger service may implement one or more consensus protocols. A consensus protocol may include a set of rules that govern how policies are added to a distributed ledger. The distributed ledger service may also implement one or more consensus algorithms that each account follows to achieve consensus. Some examples of consensus algorithms include proof of work and proof of stake.

In operation 710, the distributed ledger service may identify an access of a computing resource by the account. The access may be identified in real time or via a subsequent audit of log information. The access may include a service call, such as an API call, and the like. The access may further include the storage or editing of content. The access may also include a change to the configuration of a computing resource or the provisioning/decommissioning of a computing resource.

In operation 712, the distributed ledger service may retrieve a policy record from the distributed ledger associated with the account. The distributed ledger service may determine account information associated with the account and select one or more distributed ledgers associated with the account. The distributed ledger service may initiate one or more searches of the selected distributed ledgers for policy records. The distributed ledger service may consult an index to the distributed ledger in order the facilitate retrieval of the policy records.

According to the present technology, the distributed ledger service may obtain one or more policy statements from the policy records retrieved from the selected distributed ledgers. The distributed ledger service may translate the policy statements into actions applicable to the computing resource. For example, the distributed ledger service may translate generic instructions to one or more commands specific to a storage service. Accordingly, the policy records may use policy metadata modeling policies in a generic language. The distributed ledger service may translate the policy metadata to one or more commands, acts, or parameters applicable to a specific computing resource.

In operation 714, the distributed ledger service may apply a policy defined in the policy record to the computing resource for the account. The distributed ledger service may directly apply the policy by sending one or more instructions to the computing resource. In another example, the distributed ledger service may provide the policy to another service, such as an identity and access management service, that enforces the policy. Policy enforcement may include authorizing the access to the computing resource. In another example, a policy may indicate default settings for a computing resource. In yet another example, a policy may indicate a configuration or mechanism for provisioning a computing resource.

Figure 8:
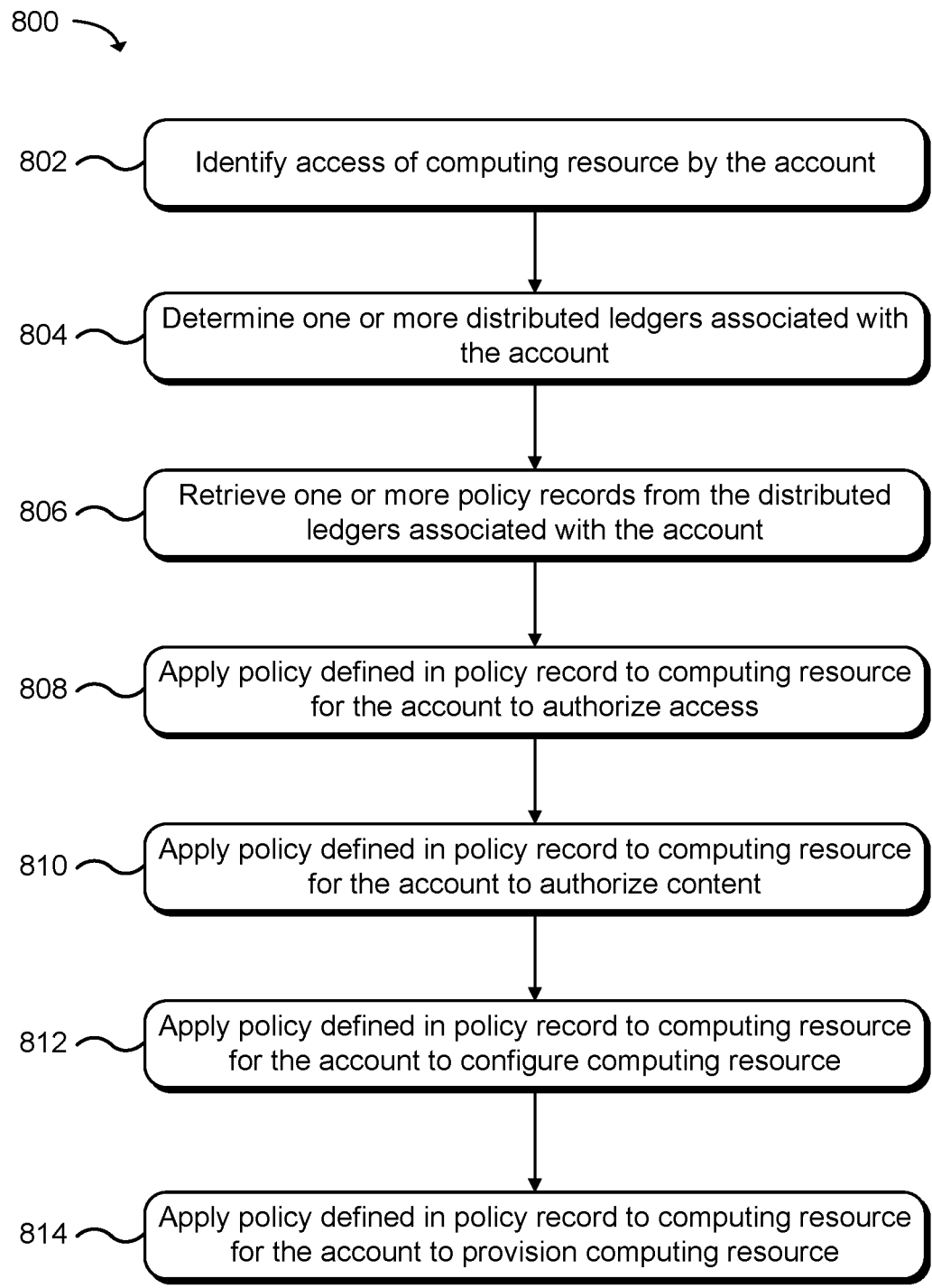
FIG. 8 is a flow diagram illustrating an example method for enforcing policies that govern computing resources using a distributed ledger service according to one example of the present technology.

FIG. 8 is a flow diagram illustrating an example method 800 for enforcing policies that govern computing resources using a distributed ledger service according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 802, a distributed ledger service may identify an access of a computing resource by the account. The access may be identified in real time or via a subsequent audit of log information. The access may include a service call, such as an API call, and the like. For example, the access may further include the storage or editing of content. The access may also include a change to the configuration of a computing resource or the provisioning/decommissioning of a computing resource.

In operation 804, the distributed ledger service may determine one or more distributed ledgers associated with the account. The distributed ledger service may determine account information associated with the account and select one or more distributed ledgers associated with the account.

In operation 806, the distributed ledger service may retrieve one or more policy records from the distributed ledgers associated with the account. The distributed ledger service may initiate one or more searches of the selected distributed ledgers for policy records. The distributed ledger service may query the distributed ledgers using a particular policy address, transaction hash, or block number. In addition, the distributed ledger service may consult an index to the distributed ledger in order the facilitate retrieval of the policy records.

In operation 808, the distributed ledger service may apply a policy defined in the policy record to authorize access. The distributed ledger service may apply the policy to authorize the identified access by allowing the access to proceed. In another example, the distributed ledger service may apply the policy to authorize the identified access by disallowing the access. The distributed ledger service may publish the results of applying the policy to authorize access to the distributed ledgers to provide an audit trail.

In operation 810, the distributed ledger service may apply a policy defined in the policy record to authorize content. The distributed ledger service may apply the policy to authorize the content by allowing data to be stored using the computing resource. The data may be authorized by data attributes, such as data type or data format, as well as by the data contents. The distributed ledger service may enable or disable public/private access, read/write access, and other content visibility settings by applying the policy to authorize the content.

In operation 812, the distributed ledger service may apply a policy defined in the policy record to configure a computing resource. The distributed ledger service may apply the policy to configure the computing resource by setting one or more default values or parameters for the computing resource. The distributed ledger service may apply the policy to configure the computing resource to set certain parameters when other parameters are set or unset. The distributed ledger service may apply the policy to configure the computing resource to operate according to a schedule.

In operation 814, the distributed ledger service may apply a policy defined in the policy record to provision a computing resource. The distributed ledger service may apply the policy to provision the computing resource to deploy or decommission the computing resource. The distributed ledger service may apply the policy to provision the computing resource by deploying a computing resource with a set configuration. The distributed ledger service may apply the policy to provision the computing resource by decommissioning or disabling a computing resource (or access thereto) unless a predetermined set of conditions are met.

According to one example of the present technology, the operations 808-814 may be performed sequentially or in parallel. In another example, only some of the operations 808-814 may be performed to apply the policy defined in the policy record to the computing resource. For example, the operations 812 and 814 to configure and provision the computing resource may not be applied to an API call to a computing resource to store data to an existing data store. The operation 808 and 810 may be performed to apply the policy defined in the policy record to authorize the access to the data store and authorize the data to be stored therein. In another example, the operations 810 and 814 to authorize content and provision the computing resource may not be applied to a configuration change to a computing resource to store change access permissions from private to public. The operation 808 and 810 may be performed to apply the policy defined in the policy record to authorize the access to the configuration data and configure the computing resource as set forth in the policy if the configuration change provides a prohibited or missing value.

Figure 9:
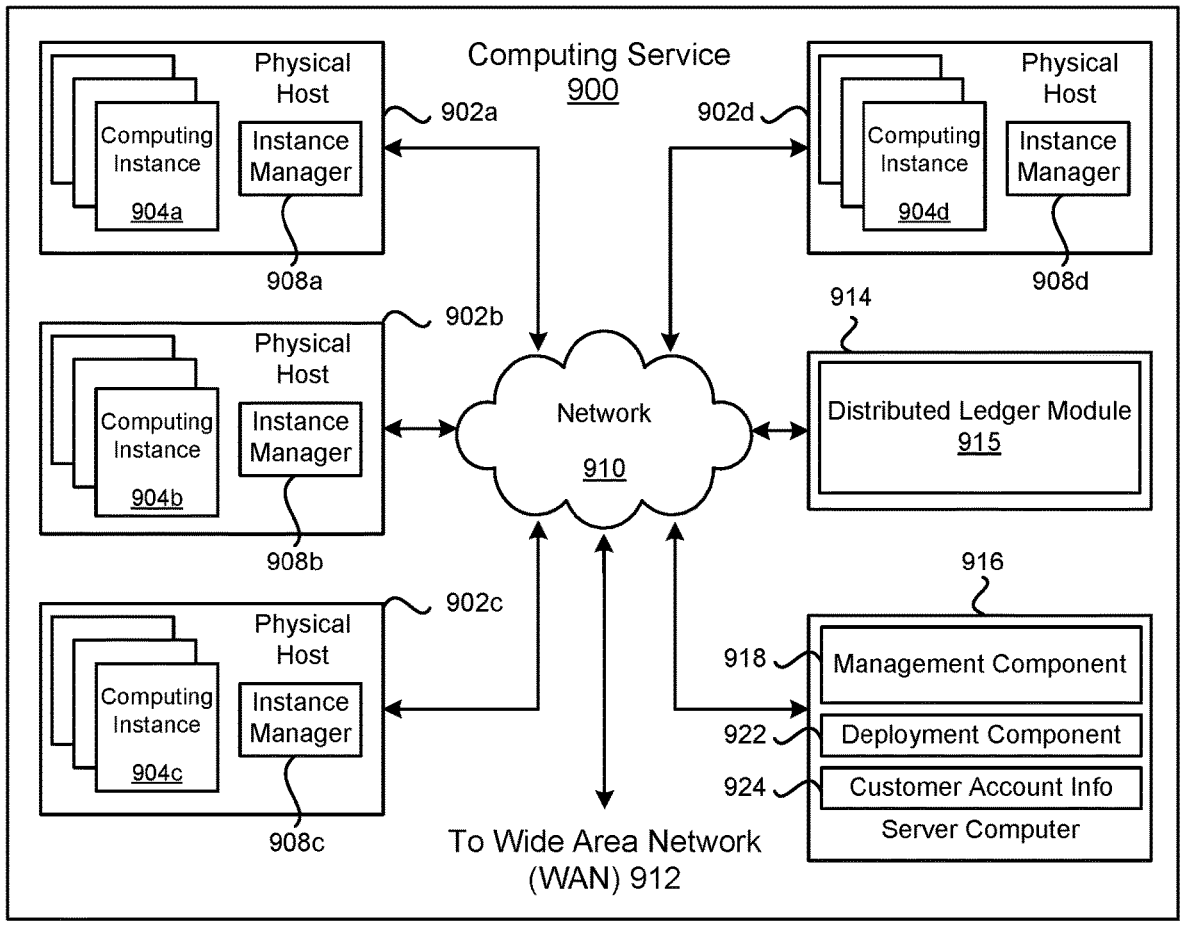
FIG. 9 is a block diagram that illustrates an example computing service environment that includes a distributed ledger service according to one example of the present technology.

FIG. 9 is a block diagram that illustrates an example computing service that includes a storage preparation service, and a retrieval and reassembly service according to one example of the present technology. The computing service 900 may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server computer 914 may be reserved to execute software components for implementing the present technology or managing the operation of the computing service 900 and the computing instances 904*a-d*. For example, the server computer 914 may execute a distributed ledger module 915 operable for distributed ledger-based governance of computing resources.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904*a-d*, provide scripts and/or other types of code to be executed for configuring computing instances 904*a-d*, provide cache logic specifying how an application cache is to be prepared, and other types of information. The deployment component 922 may utilize the customer-provided configuration and cache logic to configure, prime, and launch computing instances 904*a-d*. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the server computers 902*a-d*. The network topology illustrated in FIG. 9 has been simplified, as many more networks and networking devices may be utilized to interconnect the various computing systems disclosed herein.

Figure 10:
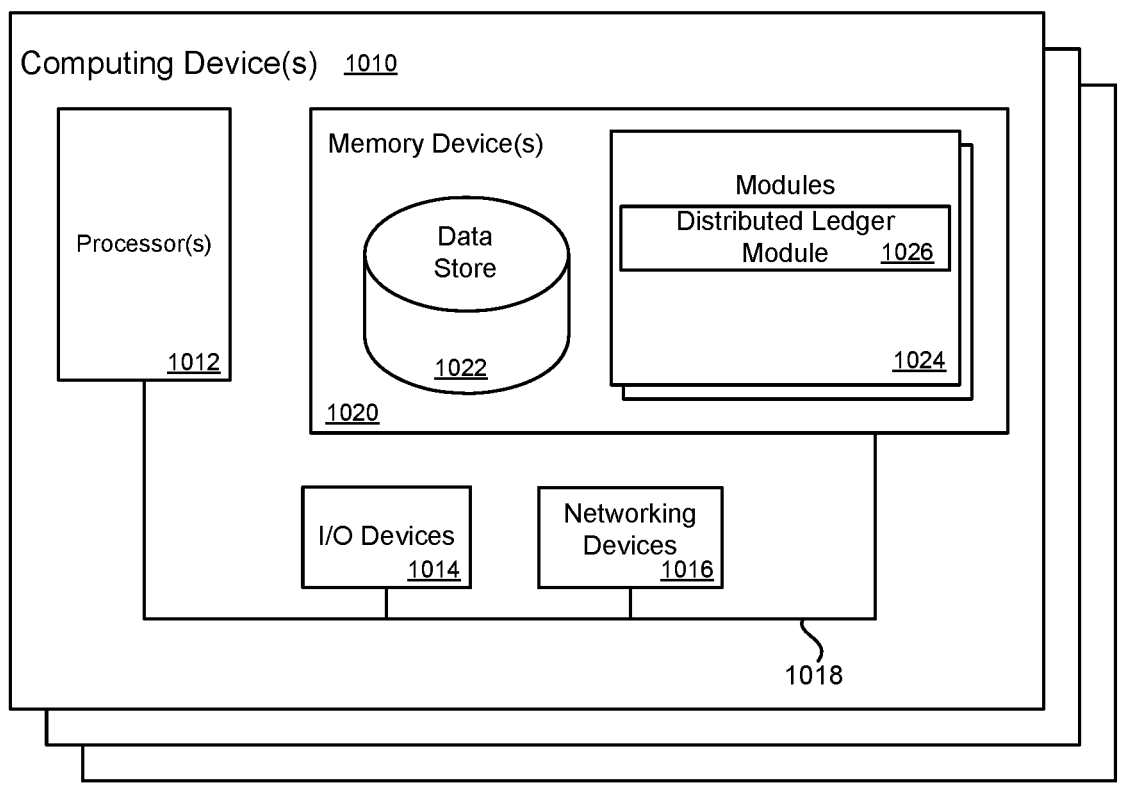
FIG. 10 illustrates one or more computing device(s) on which modules or code components of this technology may execute.

FIG. 10 illustrates one or more computing device(s) 1010 on which modules or code components of this technology may execute. A first computing device 1010 is illustrated on which a high-level example of the technology may be executed. The first computing device 1010 may include one or more processor(s) 1012 that are in communication with memory device(s) 1020. The computing device may include a local communication interface 1018 for the components in the computing device. For example, the local communication interface may be a local data bus and/or any related address or control busses as may be desired.

The memory device(s) 1020 may contain modules 1024 or code components that are executable by the processor(s) 1012 and data for the modules 1024. The modules 1024 may execute the functions described earlier. In this example, the memory device(s) 1020 include a distributed ledger module 1026 operable for distributed ledger-based governance of computing resources.

A data store 1022 may also be located in the memory device(s) 1020 for storing data related to the modules 1024 and other applications along with an operating system that is executable by the processor(s) 1012. Other applications may also be stored in the memory device(s) 1020 and may be executable by the processor(s) 1012. Components or modules discussed in this description that may be implemented in the form of software using high programming level languages that are compiled, interpreted, or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. The networking devices 1016 and similar communication devices may be included in the computing device. The networking devices 1016 may be wired or wireless networking devices that connect to the internet, a LAN, WAN, or other computing network.

The components or modules that are shown as being stored in the memory device(s) 1020 may be executed by the processor(s) 1012. The term "executable" may mean a program file that is in a form that may be executed by a processor(s) 1012. For example, a program in a higher-level language may be compiled into machine code in a format that may be loaded into a random-access portion of the memory device(s) 1020 and executed by the processor(s) 1012, or source code may be loaded by another executable program and interpreted to generate instructions in a random access portion of the memory to be executed by a processor. The executable program may be stored in any portion or component of the memory device(s) 1020. For example, the memory device(s) 1020 may be random access memory (RAM), read only memory (ROM), flash memory, a solid-state drive, memory card, a hard drive, optical disk, floppy disk, magnetic tape, or any other memory components.

The processor(s) 1012 may represent multiple processors and the memory 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   a processor; and
   a memory storing instructions which when executed cause the processor to:
   receive metadata defining a policy that governs account access to a computing resource hosted by a service provider environment;
   receive, from an account of the service provider environment, a digital signature approving the policy;
   publish, by a distributed ledger service of the service provider environment, a policy record that includes the metadata and the digital signature to a distributed ledger having a set of policy records that is replicated across a set of accounts for different users of the service provider environment;
   initiate, by the distributed ledger service, a search of the distributed ledger for policy records having policies applicable to the computing resource in response to an access of the computing resource by the account;
   receive a policy record from the distributed ledger that includes the policy that governs account access to the computing resource; and
   apply, for the account, the policy defined by the metadata in the policy record to the computing resource.

2. The system of claim 1 wherein the instructions when executed further cause the processor to:
   monitor the computing resource for the access; and
   determine whether to apply the policy to authorize the access of the computing resource by the account.

3. The system of claim 1 wherein the instructions when executed further cause the processor to:
   identify data supplied by the account to the computing resource; and
   determine whether to apply the policy to authorize access of the computing resource by the account to the data supplied by the account.

4. The system of claim 1 wherein the instructions when executed further cause the processor to:
generate an audit record using a result of applying the policy to the computing resource; and
publish the audit record to the distributed ledger to provide an audit trail available to the set of accounts of the service provider environment.

5. A method, comprising:
receiving an indication of an access of a computing resource associated with an account of a service provider environment;
identifying, for the account, a distributed ledger having a set of policy records that is replicated across a set of accounts for different users of the service provider environment that includes the account;
receiving, from the distributed ledger, a policy record having a policy applicable to the access of the computing resource associated with the account; and
applying, for the account, the policy to the access of the computing resource.

6. The method of claim 5 further comprising:
receiving, from an additional account of the service provider environment, metadata modeling the policy applicable to the access of the computing resource associated with the account;
receiving an authorization of the policy by the account; and
publishing the policy record to the distributed ledger using the metadata created by the additional account and the authorization of the policy by the account.

7. The method of claim 5 further comprising:
determining a policy statement from the policy record; and
translating the policy statement into an action to take with respect to the computing resource.

8. The method of claim 5 further comprising:
identifying an application programing interface (API) call to the computing resource as a result of the access by the account of the service provider environment; and
determining whether to apply the policy to the access of the computing resource to authorize the API call to the computing resource.

9. The method of claim 5 further comprising:
identifying data stored in the computing resource as a result of the access by the account of the service provider environment to supply the data to the computing resource;
receiving, from the distributed ledger, an additional policy record having a policy applicable to the data stored in the computing resource; and
applying the policy applicable to the data to authorize the data stored in the computing resource.

10. The method of claim 5 further comprising:
identifying a request for provisioning of the computing resource within the service provider environment as a result of the access by the account of the service provider environment; and
determining whether to apply the policy to the access of the computing resource to authorize to the provisioning of the computing resource within the service provider environment.

11. The method of claim 5 further comprising:
determining, based on the policy, a configuration for the computing resource; and
configuring the computing resource using the configuration.

12. The method of claim 5 wherein applying, for the account, the policy to the access of the computing resource further comprises at least one of: allowing the access, blocking the access, setting a parameter to a default value, changing a parameter from a first value set by the account to a second value defined by the policy, removing data supplied by the account to the computing resource, or undoing a change made by the account to the computing resource.

13. The method of claim 5 further comprising:
receiving, from the computing resource, log information indicative of the access of the computing resource by the account; and
publishing an audit log record that includes the log information to the distributed ledger.

14. The method of claim 5 further comprising:
generating an audit log record in response to applying the policy; and
publishing the audit log record to the distributed ledger to provide an audit trail for the computing resource.

15. A non-transitory computer readable medium comprising instructions which when executed by one or more processors of a computer system cause the one or more processors to:
receive, at a distributed ledger service of a service provider environment, information identifying an access of a computing service hosted by the service provider environment by an account of the service provider environment;
determine, for the account, a distributed ledger having a set of policy records that is replicated across a network to a set of accounts for different users of the service provider environment;
receive, from the distributed ledger determined for the account, a policy record having a policy applicable to the access of the computing service by the account; and
send the policy to the computing service to apply the policy to the access of the computing service by the account.

16. The non-transitory computer readable medium of claim 15 wherein the instructions further cause the one or more processors to:
receive metadata modeling of the policy applicable to the access of the computing service by the account;
receive an authorization for the policy from the account; and
publish the policy record to the distributed ledger for the account using the metadata and the authorization.

17. The non-transitory computer readable medium of claim 15 wherein the instructions further cause the one or more processors to:
determine a policy statement from the policy record; and
send the policy statement to the computing service.

18. The non-transitory computer readable medium of claim 15 wherein the instructions further cause the one or more processors to:
identify an application programing interface (API) call to the computing service by the account; and
search the distributed ledger for the policy record having the policy applicable to the access of the computing service by the account to authorize the API call to the computing service.

19. The non-transitory computer readable medium of claim 15 wherein the instructions further cause the one or more processors to:
receive information identifying data stored by the computing service as a result of the access by the account of the service provider environment to supply the data to the computing service; and search the distributed ledger for an additional policy record having a policy applicable to the data to authorize access to the data stored by the computing service.

20. The non-transitory computer readable medium of claim 15 wherein the instructions further cause the one or more processors to:

receive an audit log record in response to an application of the policy to the access of the computing service by the account; and publish the audit log record to the distributed ledger to provide an audit trail for the computing service.

\* \* \* \* \*